Sept. 25, 1962 W. D. NOVAK 3,055,131

FILE CARD VIEWING SYSTEM

Filed Sept. 17, 1959 15 Sheets-Sheet 1

INVENTOR.
WARREN D. NOVAK

BY H. L. Mackey

ATTORNEY.

Sept. 25, 1962 W. D. NOVAK 3,055,131

FILE CARD VIEWING SYSTEM

Filed Sept. 17, 1959 15 Sheets-Sheet 2

INVENTOR.
WARREN D. NOVAK

BY H. S. Mackey

ATTORNEY

INVENTOR.
WARREN D. NOVAK
BY
H. L. Mackey
ATTORNEY.

Sept. 25, 1962 W. D. NOVAK 3,055,131

FILE CARD VIEWING SYSTEM

Filed Sept. 17, 1959 15 Sheets-Sheet 4

INVENTOR.
WARREN D. NOVAK

BY H. L. Mackey

ATTORNEY

Sept. 25, 1962 W. D. NOVAK 3,055,131

FILE CARD VIEWING SYSTEM

Filed Sept. 17, 1959 15 Sheets-Sheet 5

*INVENTOR.*
WARREN D. NOVAK

BY H. S. Mackay

ATTORNEY.

Sept. 25, 1962 W. D. NOVAK 3,055,131

FILE CARD VIEWING SYSTEM

Filed Sept. 17, 1959

15 Sheets-Sheet 6

*INVENTOR.*
WARREN D. NOVAK

*BY*

H. L. Mackey

ATTORNEY.

Sept. 25, 1962 W. D. NOVAK 3,055,131

FILE CARD VIEWING SYSTEM

Filed Sept. 17, 1959 15 Sheets-Sheet 7

INVENTOR.
WARREN D. NOVAK

BY H. L. Mackey

ATTORNEY

INVENTOR.
WARREN D. NOVAK
BY
H. A. Mackey
ATTORNEY.

Sept. 25, 1962 W. D. NOVAK 3,055,131

FILE CARD VIEWING SYSTEM

Filed Sept. 17, 1959 15 Sheets-Sheet 9

INVENTOR.
WARREN D. NOVAK

BY [signature]

ATTORNEY.

INVENTOR.
WARREN D. NOVAK
BY
H. A. Mackey
ATTORNEY.

Sept. 25, 1962 W. D. NOVAK 3,055,131

FILE CARD VIEWING SYSTEM

Filed Sept. 17, 1959 15 Sheets-Sheet 11

INVENTOR.
WARREN D. NOVAK

BY A. A. Mackey

ATTORNEY.

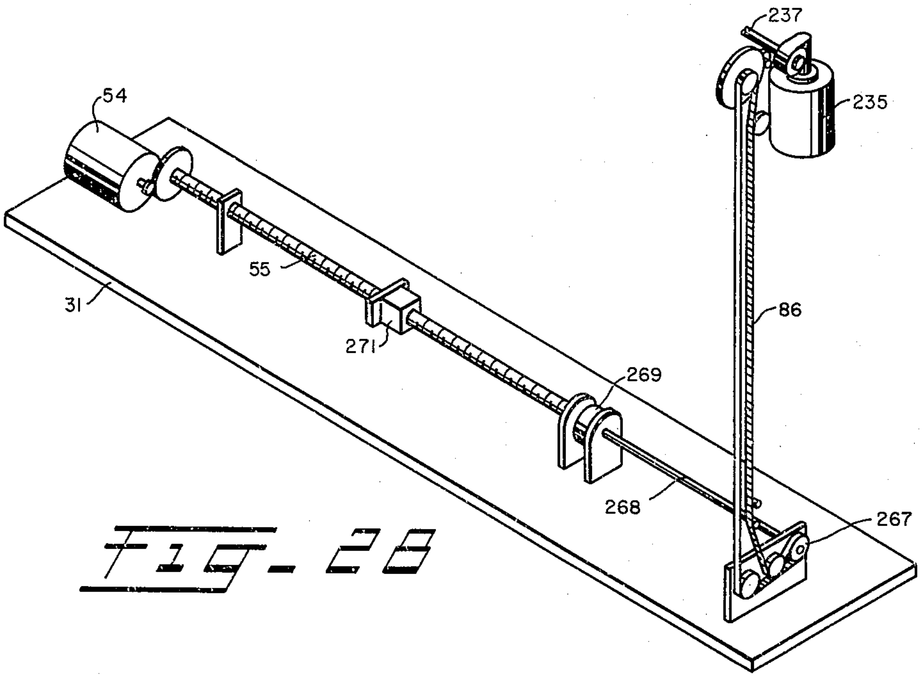
FIG. 28
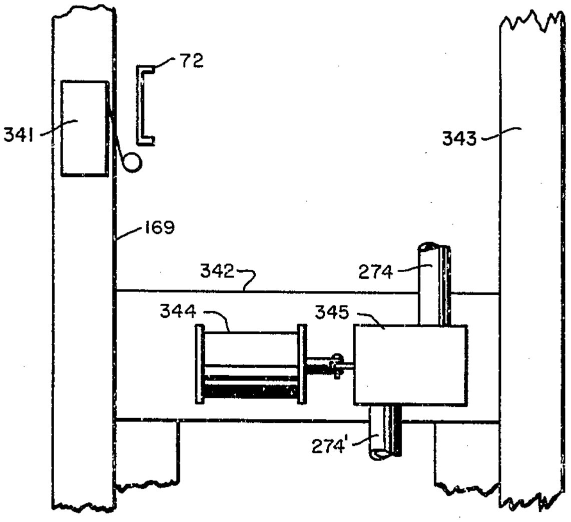
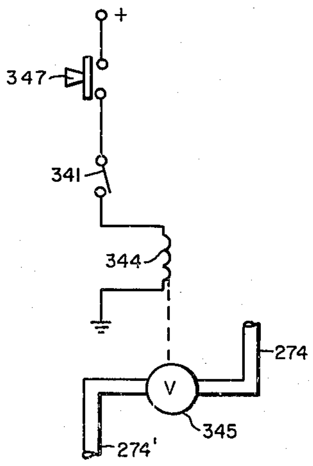
FIG. 34
FIG. 33
INVENTOR.
WARREN D. NOVAK
BY H. L. Mackey
ATTORNEY.

Sept. 25, 1962 W. D. NOVAK 3,055,131

FILE CARD VIEWING SYSTEM

Filed Sept. 17, 1959

15 Sheets-Sheet 13

INVENTOR.
WARREN D. NOVAK

BY A. L. Machey

ATTORNEY.

INVENTOR.
WARREN D. NOVAK

BY H. A. Mackey

ATTORNEY.

FILE CARD VIEWING SYSTEM

Filed Sept. 17, 1959 15 Sheets-Sheet 15

INVENTOR.
WARREN D. NOVAK

BY H. L. Machey

ATTORNEY

United States Patent Office 3,055,131
Patented Sept. 25, 1962

3,055,131

FILE CARD VIEWING SYSTEM

Warren D. Novak, Chappaqua, N.Y., assignor to General Precision, Inc., a corporation of Delaware
Filed Sept. 17, 1959, Ser. No. 840,552
17 Claims. (Cl. 40—36)

This invention relates to apparatus for selecting and viewing standard file cards from a remote point.

The world has a great store of information covering a vast number of different fields of knowledge. There is so much information stored in so many places that it is difficult for a worker to locate the precise information he requires for the job at hand. One widely used device to assist the worker in his search is the familiar file card which is found in libraries, government departments, business offices, schools, banks, newspaper offices, and other places. Some file cards, such as those used in libraries, are primarily indexes to other sources of information while other cards, such as those used by banks to record depositors' signatures, themselves contain the desired information.

As a file of cards is built up, the cards themselves and their containers become bulky and cannot be transported conveniently from place to place. Therefore, it is usually necessary for each person who wishes to use the file to go to its location to do so. A file could be utilized far more effectively if it were possible for persons at remote locations to view the file. It is therefore a general object of the present invention to provide apparatus for viewing file cards from a remote point.

The kind of information stored and the usual manner of using various files is so diverse that different techniques and apparatus are required to permit remote viewing under various circumstances. For example, a bank teller at a branch bank may wish to view the card containing a depositor's signature. In this case he needs to see but a single particular card and accordingly a completely automatic system for bringing the one desired card into view on a screen would be most suitable. As another example, a newspaper editor may wish to see all the photographs on file of a certain person so that he may select the proper picture to accompany a news item. This of course would require apparatus enabling him to browse through a number of cards.

The general approach to the problem involves presenting individual cards to the field of view of a television camera so that an image may be transmitted to a remote point. Regardless of whether the particular situation requires automatic selection of a single card or facilities to permit browsing, mechanical handling of the cards within each file drawer is required. One arrangement which has been proposed involves opening the pack of cards in their file drawer sufficiently to present the face of one card to the field of view of the television camera. Successive cards are viewed by turning the cards over one at a time by means of a reciprocating vacuum orifice similar to a vacuum page turning device. This arrangement has a number of disadvantages. First, a substantial loss of storage capacity results because the cards must be filed loosely enough to allow the pack to be opened to an included angle of approximately eighty degrees in order to be viewed satisfactorily by the television camera. Second, it has been found to be very difficult to turn the cards reliably by a vacuum technique unless either the cards or their container are of special construction. For example, a special file drawer can be used in which the number of cards between tab cards is limited and in which the tab cards are hinged and fastened below the level of the file cards. As another example, all of the cards may be hinged and fastened to the bottom of the file drawer. In either case a special filing arrangement is required, thereby preventing the use of such an arrangement with existing files.

Accordingly, it is another general object of the invention to provide apparatus for viewing standard existing file cards at a remote point.

A more specific object is to provide apparatus for viewing any and all file cards in a file drawer.

Another object is to provide apparatus for viewing file cards which permits the cards to be filed more densely than has heretofore been possible.

Another object is to provide apparatus for presenting file cards for viewing which does not require the cards to be hinged or fastened.

Another object is to provide apparatus for presenting file cards for viewing which imposes no limitation on the number of file cards between tab cards.

File cards of various sizes stored in various containers are, of course, to be found but investigation shows that a surprisingly large number of cards now in use are the standard 3" x 5" size stored in wooden file drawers approximately seventeen inches long and of a very nearly standard construction. Such cards are found in most libraries in this and other countries and in many other places. They are almost always divided by separator cards having upstanding tabs about an inch wide arranged in five columns. The invention will be described therefore with reference to a specific embodiment which has been constructed for viewing such 3" x 5" cards stored in a standard library file drawer, although it will be understood that the invention is equally applicable to other sizes of cards and drawers and to other planar records such as photographic prints, photographic plates, and cut film.

Briefly stated, the embodiment of the invention described herein comprises a carriage into which the drawer of cards is placed. The carriage is movable longitudinally by means of a motor under the control of an operator. Several small metal strips or flags, one for each column of tabs are suspended just above the carriage and hang downward to the level of the tabs so that as the carriage moves forward, successive tabs engage one or another of the flags. The deflection of a flag by a tab as the tab passes beneath is an indication of the longitudinal position of that tab. When the desired tab engages a flag, the operator stops the carriage and pushes an "open" switch which initiates two operations. First, a metal bar is swung into a position just behind the desired tab and second, the carriage is moved backward a predetermined distance. As it moves, the bar engages the tab thereby opening the pack.

The apparatus is now ready to manipulate individual cards. A plate, or platen, positioned above the opening in the pack is provided with a pneumatic arrangement for holding a card placed thereon. Another similar plate with a similar pneumatic arrangement is mounted for vertical movement beside the first. In operation, the second plate descends into the opening in the pack, picks up a card, rises, and transfers the card to the viewing platen. The card is now clearly visible.

The invention as briefly outlined above may, of course, be used as a direct viewing arrangement with a suitable control panel placed nearby. However, the apparatus was developed for use as a remotely controlled system and many features make it particularly suited for such use. The complete system therefore includes a television camera mounted to include within its field of view the card as held by the platen, the metal flags, and the tabs in the vicinity of the flags. A monitor bearing the image "seen" by the camera may be placed at any desired remote location, along with a suitable control panel.

For a clearer understanding of the invention, reference may be made to the following detailed description and the accompanying drawings, in which:

FIGURE 28 is an isometric view showing the two drive mechanisms, all other parts being omitted;

FIGURE 33 is a side elevation view of apparatus used to replace the last card examined; and FIGURE 34 is a schematic diagram of the electric connections of the card replacing apparatus.

*Overall Description*

Figure 1:
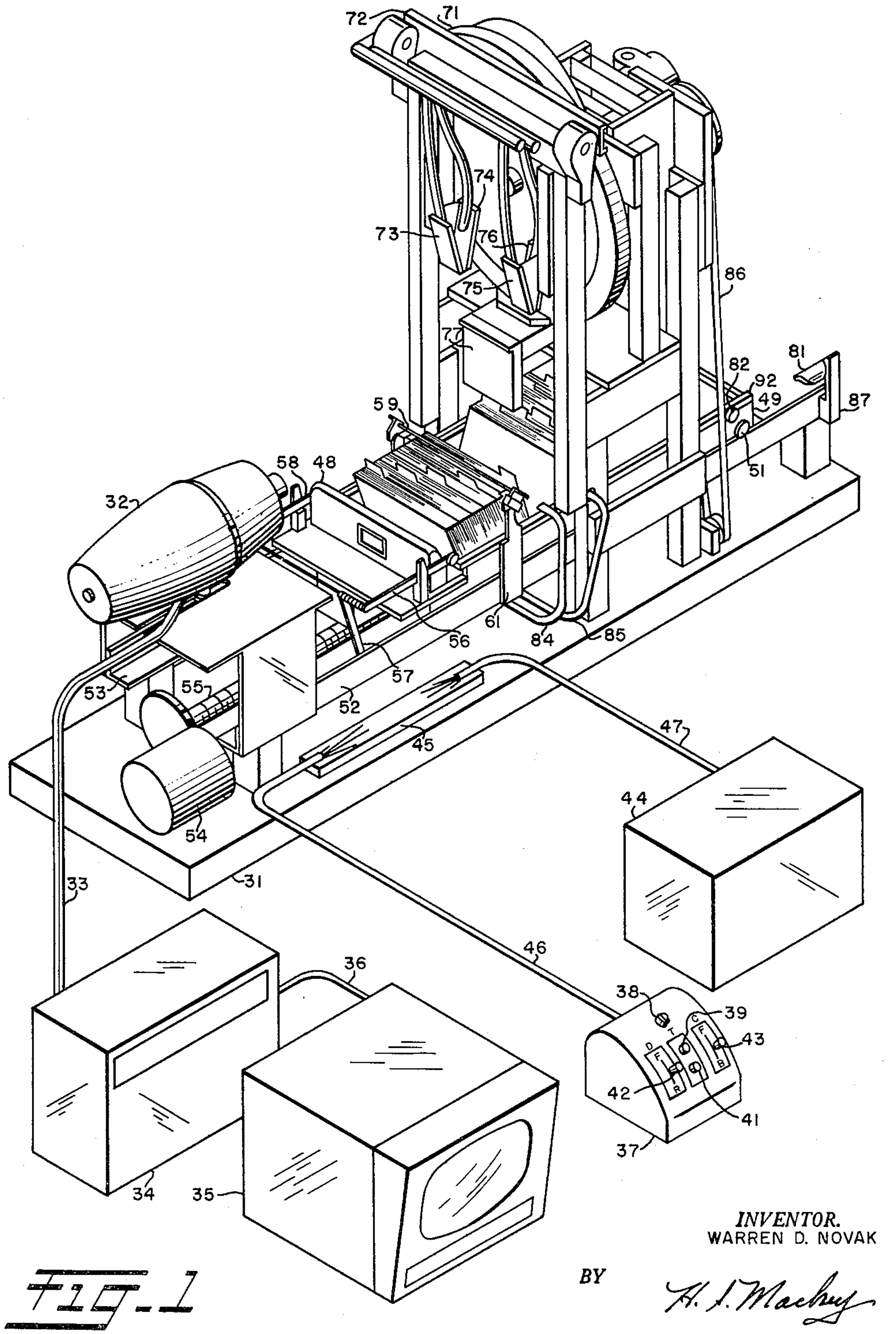
FIGURE 1 is a pictorial view of the entire apparatus.

Referring first to FIG. 1, there is shown a base 31 on which the card handling mechanism is mounted and which also supports a television camera 32. The camera 32 is connected by means of a cable 33 to a camera control unit 34 containing the necessary circuitry for generating suitable voltages for operating the camera 32 and which also contains an amplifier for raising the level of the video signal from camera 32. The amplified signal is transmitted to a television monitor 35 through a cable 36. There is also shown a small control panel 37 including a pilot lamp 38, an "open" switch 39, a "close" switch 41, a "drawer" toggle 42, and a "card" toggle 43. Also shown is a machine control unit 44 containing the power supplies, relays and other components necessary to control the operation of the equipment mounted on the base 31. The control panel 37 and the control unit 44 are connected to a terminal strip 45 on the base 31 by means of cables 46 and 47, respectively. The base 31 and the equipment mounted thereon is preferably located near the storage area of the cards to be viewed while the monitor 35 and the control panel 37 may be located at any desired remote location. The camera control unit 34 and the machine control unit 44 may be located in any convenient out of the way spot.

Visible in FIG. 1 is a standard wooden file drawer 48 which rests in a carriage 49. The carriage is equipped with four wheels, one of which appears at 51, another of which is in a comparable position on the other side of the drawer, and the other two of which are on the under side of the carriage and are not visible in FIG. 1. The wheels rest on two angle shaped tracks 52 and 53, the wheel 51 and its counterpart on the other side resting on the top edges of the angled track while the underneath wheels rest on the flat horizontal portions of the tracks 52 and 53. The carriage may be moved longitudinally on the tracks by means of an electric motor 54 which is geared to a threaded lead screw 55 which in turn cooperates with a nut (not shown in FIG. 1) fastened to the under side of the carriage 49.

Fastened to the carriage 49 is a pack closing mechanism of which one side bar 56 and one lever 57 can be clearly seen in FIG. 1. Another side bar 58 is partially visible, and the forward ends of the two bars are joined by a rod (not visible in FIG. 1) which extends just behind the front wall of the drawer 48 but in front of the cards. This pack closing mechanism will be more fully described subsequently with the aid of FIGS. 2 and 7, but for the present it is sufficient to note that energization of a solenoid (not visible in FIG. 1) causes the side bars 56 and 58, and the above mentioned rod, to move toward the back of the drawer thereby closing the pack and placing all of the cards in a backward sloping position.

Figure 2:
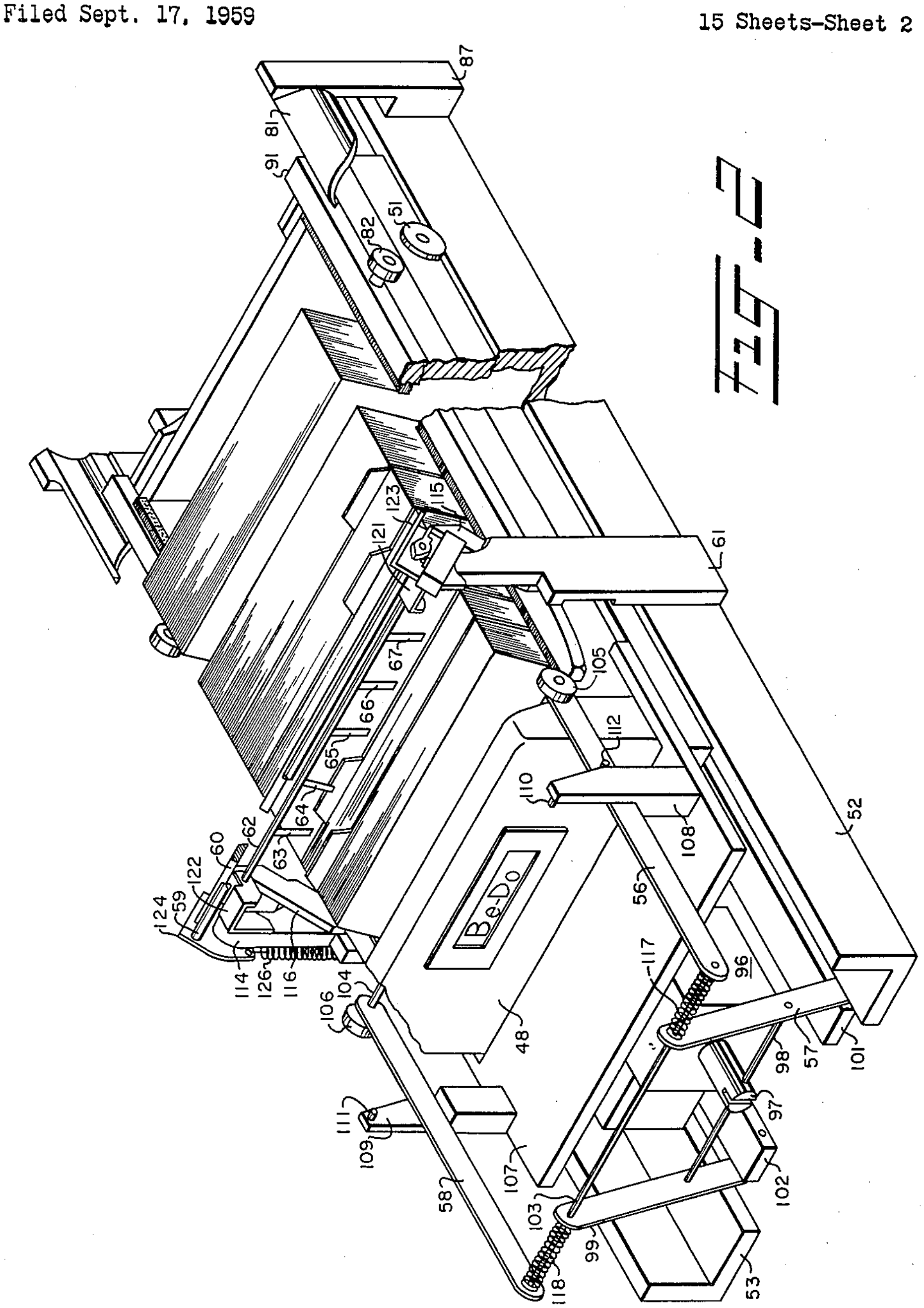
FIGURE 2 is a pictorial view of the carriage with a drawer in place.

A rod 59 extends laterally above the level of the cards and the drawer 48 and is pivotally supported by two brackets, one of which can be seen at 61, which in turn are fastened to the tracks 52 and 53. As best shown in FIG. 2, a flat bar 60 lies in nearly the same line of sight as the rod 59, as viewed in FIGS. 1 and 2, and is also pivotally supported by the same brackets. As will be more fully explained, energization of another solenoid (not visible in either FIG. 1 or FIG. 2) causes the bar 60 to be rotated so that one edge lies between the upstanding tabs of the separator cards whereby backward movement of the drawer 48 causes a tab to engage the stationary flat bar 60 thus opening the pack.

The above mentioned bracket 61 and its counterpart on the other side of the carriage 49 also support a lateral rod 62, best shown in FIG. 2, which in turn supports five small flags 63, 64, 65, 66 and 67. Each flag consists of a thin narrow strip of metal suspended from the rod 62 and freely rotatable thereabout. The flags are within the lower portion of the field of view of the camera and are positioned so that as the drawer is moved forward, the flags are engaged by the upstanding tabs which rotate the flags slightly in passing beneath. Each such engagement can be seen clearly on the monitor 35 by the viewer thereby enabling him to observe when each tab approaches a position beneath the flat bar 60 and thereby select the tab behind which the pack is to be opened.

Also visible in FIG. 1 is a large disc 71 rotatable by means of a second electric motor (not visible in FIG. 1) and which contains six circular cam surfaces on the back side thereof for controlling the card handling operation. On the front side of the disc 71, although not visible in FIG. 1, is a small roller which cooperates with a yoke 72. The yoke 72 is fastened to a framework which in turn supports four plates 73, 74, 75 and 76. When the disc 71 is rotated through one revolution, the four plates will move downward into the V shaped opening in the pack of cards and then back up to the position shown in FIG. 1. As will be more fully explained, each plate has a small lip on top and is formed with a series of interconnected depressions on one face, one of which contains an orifice which is connected to a flexible tube. Thus, when the tube is connected to the intake side of a fan, a card placed against the face of a plate will be held there. A system of valves, to be more fully described, controls the pneumatic connections between the plates and the fan.

Also shown in FIG. 1 is another plate, or platen, 77 positioned within the field of view of the camera 32, which supports the selected card for viewing. The platen 77 also has a small lip on top and also is formed with depressions on the front face each with its own orifice all of which are pneumatically connected together and through suitable valves, to the intake side of the fan.

In the position of the parts shown in FIG. 1, the platen 77 is in the proper position so that a card held on the front face is within the field of view of the camera 32 and is in focus. One of the cams on the back of the disc 71 moves the platen 77 horizontally in a direction parallel to the length of the drawer 48.

The preliminary description of the apparatus so far given permits the overall functional operation to be outlined. The means for accomplishing all of the movements and other functions about to be mentioned are not shown in FIG. 1 but all of the details will be fully described subsequently with the aid of the remaining figures of the drawing.

*Overall Operation*

Let it be assumed that the drawer of cards is in its rear position, that is in the upper right position as viewed in FIG. 1, and that the pack has been closed so that all of the cards lie in a backward sloping position. At this time the lower portion of the image appearing on the screen of the monitor 35 includes the label on the front of the drawer 48 so that the viewer can be sure that the proper drawer has been inserted in the machine. The operator now operates the "drawer" toggle 42 to the forward position which causes the drawer to move forward. The operator may also view an image of the small flags 63–67 and as the drawer 48 comes forward these flags engage the upstanding tabs successively as best shown in FIG. 2. When a flag engages the tab behind which the pack is to be opened, the operator releases the "drawer" toggle 42 (FIG. 1) and pushes the "open" switch 39. This causes the bar 60 to be rotated into position behind the selected tab and also causes the drawer 48 to start moving backward. As it moves backward the selected tab will engage the bar 60 and continued backward movement of the drawer will cause the pack to be opened. Shortly after the pack is opened the bar will be withdrawn and the drawer stopped with the opening of the pack in the position shown in FIG. 1.

Figure 3:
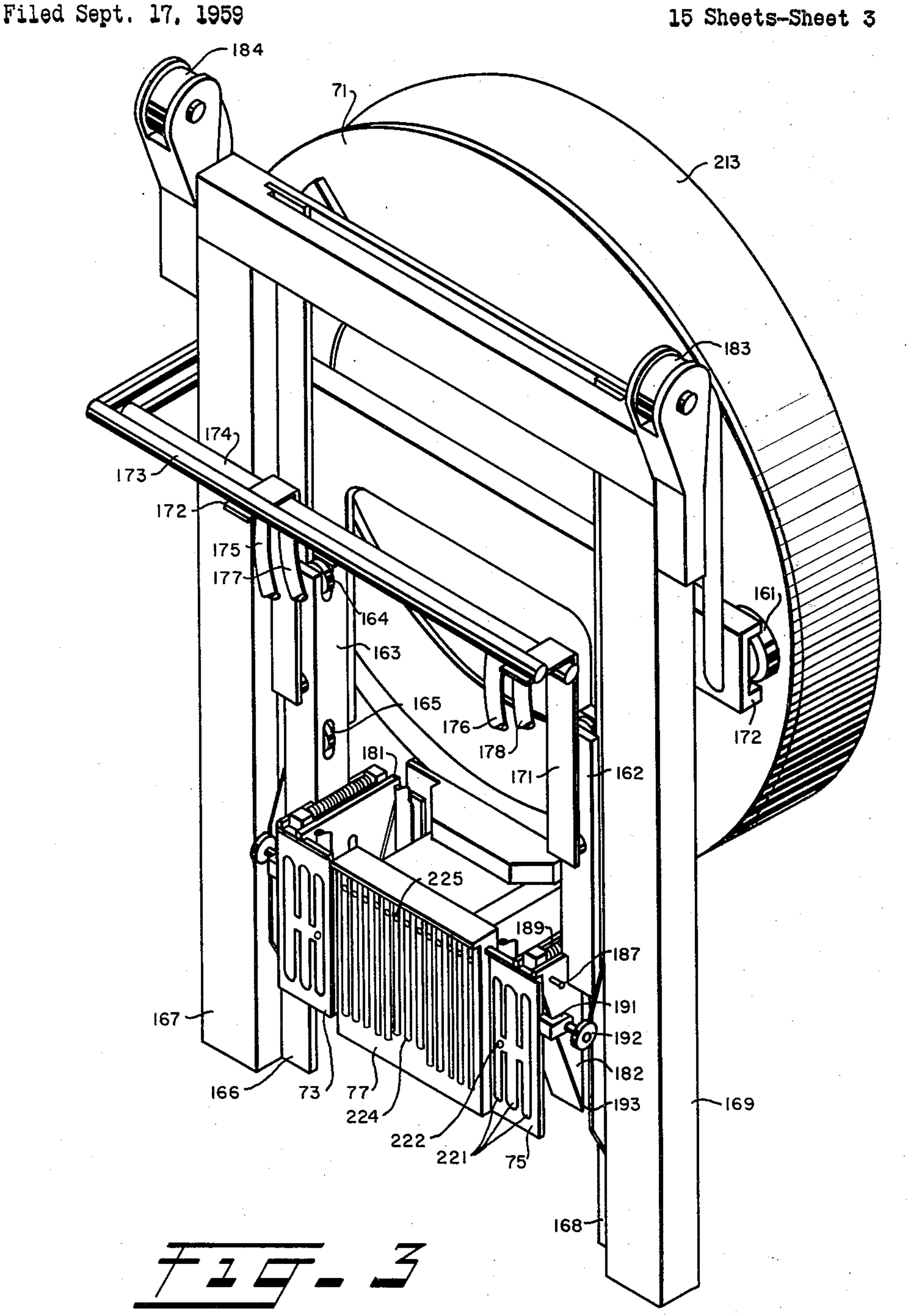
FIGURE 3 is an enlarged pictorial view of the plates and platen and the apparatus immediately associated therewith.

The operator next actuates the "card" toggle 43 in the forward direction momentarily which causes the disc 71 to be rotated through 360°. At the beginning of the rotation the previously mentioned roller on the disc 71 pushes the yoke 72 down thus causing the four plates 73–76 to start their downward movement. At the same time the platen 77 moves slightly forward and as the plates approach the platen they are swung about pivots, to be more fully described, so as to lie in vertical planes when they are abreast of the platen 77. As shown in FIG. 3, the forward plates and the platen all lie in approximately the same vertical plane at this time. The plates continue their downward movement and shortly after leaving the vicinity of the platen they are again closed into a V formation and enter the opening in the pack of cards. At about this time valves operated by the cams on the back of the disc 71 apply a vacuum to the two rear plates 74 and 76 thereby causing the face card of the backwardly sloping portion to be drawn into contact with these plates. The plates now start to rise, the rear plates 74 and 76 bringing the card with them, and all are again spread apart so that they lie in vertical planes. At the same time, the platen 77 is pushed backward so that as the plates come abreast of the platen 77 the rear plates 74 and 76 and the platen are in approximately the same vertical plane. At this time the vacuum is removed from the plates 74 and 76 and applied to the platen 77 so that continued upward movement of the plates causes the card to be transferred to the platen 77. This transfer is assisted by the small lip on the upper edge of the platen. As the plates rise they are again closed to the V formation and reach the position shown in FIG. 1 while the platen is pushed forward so that the card is in the proper position to be viewed by the camera.

The operator can now view the card on the platen 77 as long as he likes and when he is ready to view the next card he pushes the "card" toggle 43 to the forward position again. As before, the platen moves forward and the plates descend to the position shown in FIG. 3. At this time the vacuum is removed from the platen 77 and applied to the forward plates 73 and 75 so that these plates pick the card off the platen 77 and deposit it as the face card of the forwardly sloping group of cards. At the lower limit of travel of the plates the vacuum is removed from the front plates 73 and 75 and applied to the rear plates 74 and 76 so that the next card of the backwardly sloping group of cards is picked up and deposited on the platen as before. This cycle of operation can be repeated as often as desired. It is also possible to go backward and reexamine a card previously viewed. This backward operation is accomplished simply by moving the "card" toggle 43 to the "backward" position whereupon the disc 71 turns in the opposite direction. The platen 77 moves backward, the rear plates 74 and 76 pick the card off the platen and deposit it as the face card of the backwardly sloping group while the front plates 73 and 75 pick up the face card of the forwardly sloping group and, as they rise, deposit this card on the platen. This cycle may also be repeated as often as desired.

Some other elements of the apparatus not yet mentioned can be seen in FIG. 1 and will be noted before considering the figures showing details. There can be seen a cam 81 which cooperates with a small roller 82 to place a strip of mohair 92 in contact with the edges of the cards as the drawer is moved forward, as will be more fully explained. It has been observed that, in the absence of the strip of mohair 92, when the pack is opened either manually or automatically, the first few cards of each portion tend to spring back towards a vertical position thereby partially reclosing the V shaped opening. It has been found that the mohair strip provides enough friction to restrain the movement of the individual cards sufficiently, in a direction parallel to the length of the drawer, so that when the pack is opened the cards remain in their proper forward or backward sloping positions.

Also shown are two small pipes 84 and 85 through which air is blown against the cards adjacent to the V shaped opening. Another pair of pipes are similarly placed on the opposite side of the apparatus. The air streams serve to separate the face card of each group slightly from the remainder of the pack although excessive separation is prevented by the above mentioned mohair strip. The two features—the mohair strip and the air streams—allow the pack to be opened yet assure that but a single card will be abstracted by the plates.

Each card occupies only about 0.01 inch of space in the drawer but as a number of cards are transferred from the backward sloping portion to the forward sloping portion the cumulative change in position of the V-shaped opening is substantial. Accordingly, an "inching" arrangement is provided to move the carriage 49 slightly whenever the disc 71 rotates. A portion of this arrangement can be seen in FIG. 1 and includes a toothed belt 86 the upper end of which is geared to the disc 71 and the lower end of which is connected through an electrically controlled clutch (not visible in FIG. 1) to the lead screw 55. As will be more fully explained, the clutch is controlled so as to be engaged only while the disc 71 is being rotated. As a result, each rotation of the disc 71 rotates the lead screw 55 slightly thereby adjusting the longitudinal position of the carriage by approximately the thickness of one card. However, when the disc 71 is stationary, the clutch is disengaged so that rotation of the lead screw 55 by the motor 54 cannot drive the belt 86 and the disc 71.

*Mohair Strip*

Figure 4:
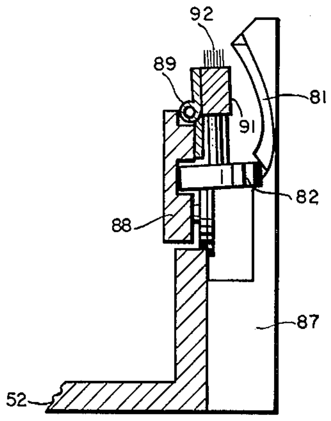
FIGURES 4, 5 and 6 are fragmentary sectional views of one rear corner of the apparatus.

The physical arrangement of the apparatus and its mode of operation, hitherto considered in a general way, may now be examined in more detail. Let it be assumed that the carriage 49 is in its rearmost position and that the drawer has not yet been inserted. The parts at the rear corner will then be positioned as shown in FIG. 4 in which there can be seen the track 52 to which is fastened a bracket 87 which in turn supports the cam 81. There can also be seen a frame portion 88 of the carriage 49 to which is fastened one butt of a "piano" hinge 89. The other butt carries a long bar 91 to one side of which is fastened the previously mentioned strip of mohair fabric 92 and to the other side of which is journaled the previously mentioned roller 82 which engages and follows the surface of cam 81. A spring (not shown) within the hinge 89 urges the bar 91 and the mohair 92 counterclockwise, to the left and downward, as viewed in FIG. 4, but since the roller 82 bears against the cam 81 the parts are held in the position shown.

Figure 5:
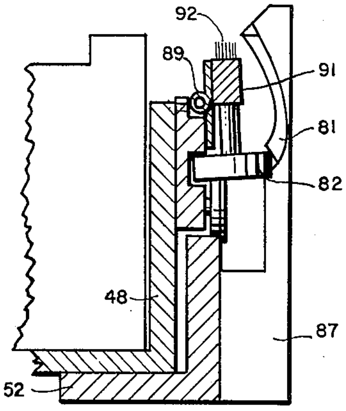

It will be noted that with the parts in the position shown in FIG. 4, with the carriage 49 at its rear position, the bar 91 and the mohair 92 will not interfere with the insertion of a drawer of cards into the carriage. The drawer 48 may therefore be placed in the carriage 49 and the parts will appear as shown in FIG. 5, with the bottom of the drawer resting on the horizontal surface of the angle shaped tracks 52 and 53.

Figure 6:
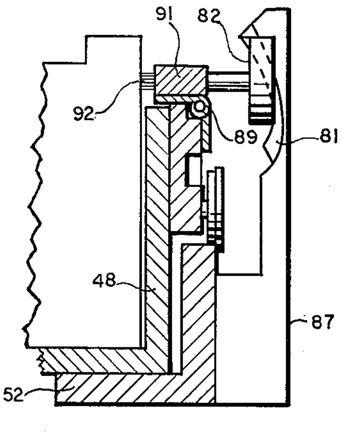

After the drawer is inserted, the operator may move the carriage forward by actuating the "drawer" toggle 42 (FIG. 1) and as the carriage moves, the roller 82, following the surface of the cam 81, allows the spring in the hinge 89 to rotate the bar 91 and the mohair strip 92 to the position shown in FIG. 6, with the ends of the fibers engaging the sides of the cards.

*Pack Closer*

Figure 7:
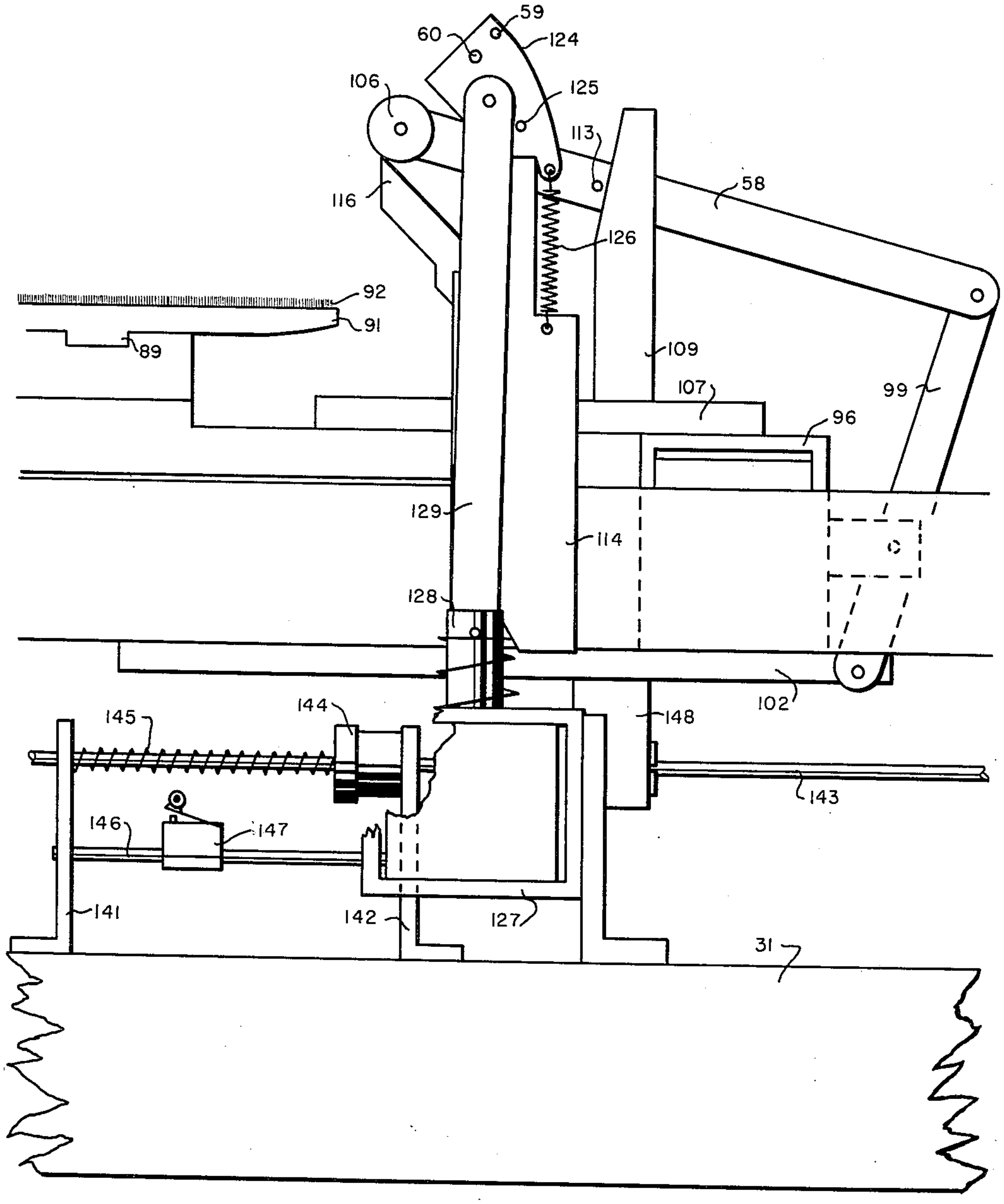
FIGURE 7 is a side elevation view of a portion of the apparatus taken from the side away from the viewer in FIG. 1.

Let us now examine the apparatus at the front of the machine while the carriage is at its rearmost position. Turning to FIG. 7, which shows the apparatus before the drawer is inserted, there can be seen the bar 91, the hinge 89, and the mohair fibers 92 in the vertical position. Also shown is the pack closing solenoid 96, the mechanical connections to which are best shown in FIG. 2, although it should be noted that FIG. 2 shows the position of the parts after the drawer has been inserted and the carriage advanced from its rearmost position. Turning now to FIG. 2, the core 97 of the solenoid 96 is connected to a transverse rod 98 which in turn is connected to intermediate points on two levers 57 and 99. The lower ends of the levers 57 and 99 are pivoted to two frame portions 101 and 102 of the carriage 49 while the upper ends are pivoted to intermediate points on a transverse rod 103. The ends of the rod 103 are pivoted to one end of each of two longitudinal bars 56 and 58, the other ends of which are joined by a crossbar 104. The ends of the crossbar 104 extend through the bars 56 and 58 and are provided with small rollers 105 and 106. Mounted on a flat table-like portion 107 of the carriage 49 are two uprights posts 108 and 109 each having a cut away portion forming a horizontal surface limiting the downward movement of the bars 56 and 58, and on which surfaces these bars rest, when the apparatus is in the position shown in FIG. 2. The posts 108 and 109 are each provided with a horizontal pin shown at 110 and 111 which limit the upward movement of the bars 56 and 58. The bars 56 and 58 are provided with pins 112 and 113, only pin 112 being visible in FIG. 2, which limit the forward movement of the bars 56 and 58.

The upstanding bracket 61 and its counterpart 114 on the other side of the carriage which are fastened to the tracks 52 and 53 support not only the previously mentioned lateral rod 59, pack opening bar 60, and flag supporting rod 62 but in addition carry two ramps, 115 and 116, respectively. When the carriage is in its rearmost position as illustrated in FIG. 7, the rollers 105 and 106 bear on the top of the ramps 115 and 116. As the carriage moves forward (to the right as viewed in FIG. 7 and to the left as viewed in FIG. 2) the rollers 105 and 106 ride down the ramps 115 and 116, the crossbar 104 drops into position behind the front wall of the file drawer 48, and the side bars 56 and 58 rest on the horizontal surfaces of the posts 108 and 109, as shown in FIG. 2. It is obvious that energization of the solenoid 96 will push the rod 104 backward and, if the pack has previously been broken open, it will thereby be closed. Although the force of gravity urges the side bars 56 and 58 and the crossbar 104 downward, some additional downward force has been found desirable to counteract any tendency of the crossbar 104 to rise as it bears against the cards during the pack closing operation. This additional force is provided by two torsion springs 117 and 118 placed around the transverse rod 103 and having their inner ends fastened to the levers 57 and 99 respectively and their outer ends fastened to the side bars 56 and 58 respectively.

Figure 8:
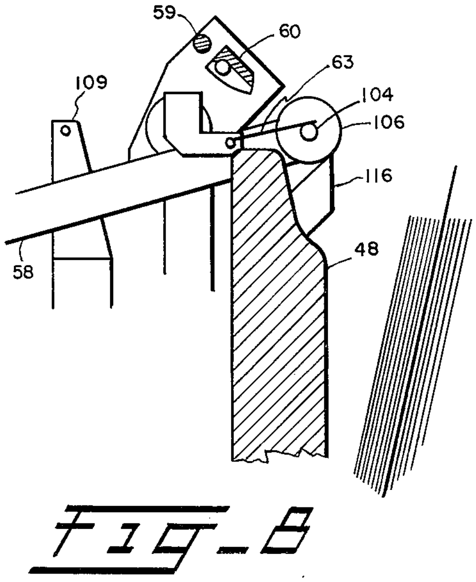
FIGURE 8 is a view, partly in section, taken from the middle of the drawer and looking toward the left, as viewed in FIG. 2, but showing the parts in positions different from those shown in FIG. 2.

When the carriage moves backward from the position shown in FIGS. 1 and 2, the rollers 105 and 106 ride up the ramps 115 and 116 to the position shown in FIG. 7 thereby raising the crossbar 104 out of the way so as to allow the drawer 48 to be removed from the carriage. At the same time, as shown in FIG. 8, the crossbar 104 engages each of the flags 63–67, pushing them backward and upward (counterclockwise as viewed in FIGS. 2 and 8), to the position shown in FIG. 8, so that the flags also are above the level of the top of the front wall of the drawer 48 thus permitting removal of the drawer. Similarly, with the parts in this position, a drawer can be inserted without interference from any of the parts of the apparatus.

*Pack Opener*

Let us now consider the pack opening apparatus in more detail. Referring to FIG. 2, there can be seen a pair of brackets 121 and 122 rigidly fastened to the inside surfaces of brackets 61 and 114, respectively. The brackets 121 and 122 support the previously mentioned lateral rod 62 which in turn carries the small flags.

Also shown are two brackets 123 and 124 positioned on the outside of and supported by the brackets 61 and 114, respectively. Brackets 123 and 124 are rigidly connected to the previously mentioned rod 59 but are each pivotally mounted to be freely rotatable about the brackets 61 and 114. As shown in FIG. 7 the bracket 124 is pivoted to the bracket 114 by means of a stub shaft 125 and is normally held in the position shown in FIGS. 1, 2 and 7 by a spring 126 connected between the bracket 124 and the bracket 114. A solenoid 127 mounted on the base 31 has its core 128 connected to a strap 129 which in turn is connected to the bracket 124 so that when the solenoid is energized the bracket will be rotated against the urging of the spring 126 in the counterclockwise direction as viewed in FIG. 7. There can also be seen in FIG.

7 the points on the bracket 124 to which the rod 59 is rigidly fastened and at which the flat bar 60 is pivotally supported.

Figure 9:
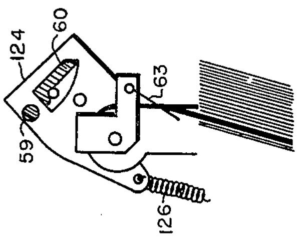
Figure 13:
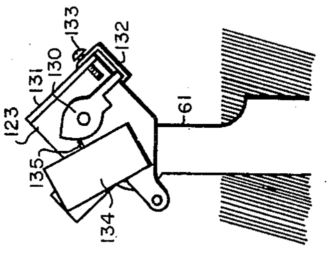

Turning now to FIG. 9, it can be seen that the bar 60 has a generally L shaped cross-section over most of its length as shown by the cross-hatched portion but that it is enlarged near the end as shown by the full outline where it is journaled in the bracket 124 by means of a stub shaft. The opposite end is similarly shaped and includes a corresponding stub shaft which is journaled in the bracket 123. As shown in FIG. 13, this stub shaft extends through the bracket 123 and has a cam 130 rigidly fastened thereto so that the flat bar 60 and the cam 130 turn as a unit. The bracket 123 has a flange portion 131 to which another small flange 132 is fastened so as to extend around one corner of the bracket 123. The cam 130 has a finger portion which bears against one upturned edge of the flange 132 as shown in FIG. 13 which limits the rotation of the flat bar 60 and the cam 130 in the clockwise direction as viewed in FIG. 13. A machine screw 133 is threaded through both the flange 131 and the flange 132 and serves as a stop to limit the counterclockwise rotation of the cam 130 and the flat bar 60. The pivot point of the bar 60 is so located that the force of gravity normally holds the bar 60 and the cam 130 in the position shown in FIGS. 9 and 13. Also shown in FIG. 13 is a small micrometer switch 134, the actuator 135 of which is positioned adjacent to the cam 130.

Figure 14:
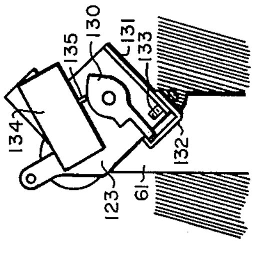

FIGS. 1, 2, 9 and 13 all show the parts in the same position. In FIG. 9 there can be seen the flag 63 just being engaged by an upstanding tab and at this point the carriage is in the proper position to have the pack opened behind this tab. The operator may now release the "drawer" toggle 42 and push the "open" switch 39 (FIG. 1) which energizes the solenoid 127 (FIG. 7) and rotates the apparatus about the stub shaft 125 to the position shown in FIGS. 10 and 14. It is noted that the bar 60 and the cam 130 have not rotated about their pivot point. It is also noted that there is a space between the bar 60 and the upstanding tab at this time. The amount of space depends upon the position of the parts at the moment the operator releases the "drawer" switch 42 but since he is guided only by the appearance of the flag 63 as it is tilted by the tab, the amount of space may vary considerably from one operation to the next. However, as will become evident, there is nothing critical about the moment at which the switch 42 is released or the amount of space between the bar 60 and the tab.

Closure of the switch 39 also starts the carriage moving backward and as the carriage moves the tab moves with it (to the right as viewed in FIGS. 9–16). Presently the tab engages the flat bar 60 and rotates it and the cam 130 about their pivot points in the brackets 123 and 124 to the positions shown in FIGS. 11 and 15. Rotation of the cam 130 depresses the actuator 135 of the switch 134 but excessive rotation is prevented by the engagement of the finger portion of the cam with the screw 133 which acts as a stop. It is noted that the amount of the previously existing space between the bar 60 and the upstanding tab has no effect on the longitudinal position of the carriage at which the switch 134 is actuated but that actuation of the switch occurs at a definite longitudinal position of the upstanding tab, that is, just when the force is sufficient to rotate the bar 60 and the cam 130.

To understand the effect of the actuation of the switch 134, reference is again made to FIG. 7 wherein there are shown two supports 141 and 142 mounted on the base 31 each having an aperture through which is passed a long rod 143. As shown, the rod 143 is positioned beneath the carriage and parallel to the length thereof. Another support (not shown) similar to the support 141 is located at the forward end of the base 31, to the right of the apparatus shown in FIG. 7. The apertures in all of the supports are large enough so that the rod 143 is freely movable longitudinally. A collar 144 is rigidly fastened to the rod 143 and is urged against the support 142 by a spring 145 around the rod 143 one end of which bears against the collar 144 and the other end of which bears against the support 141.

A bar 146 is located directly beneath the rod 143 and is mounted rigidly on the supports 141 and 142. A small micrometer switch 147 is mounted on the bar 146 and is so positioned that the top of the actuator lies above the level of the bottom of the collar 144.

Figure 17:
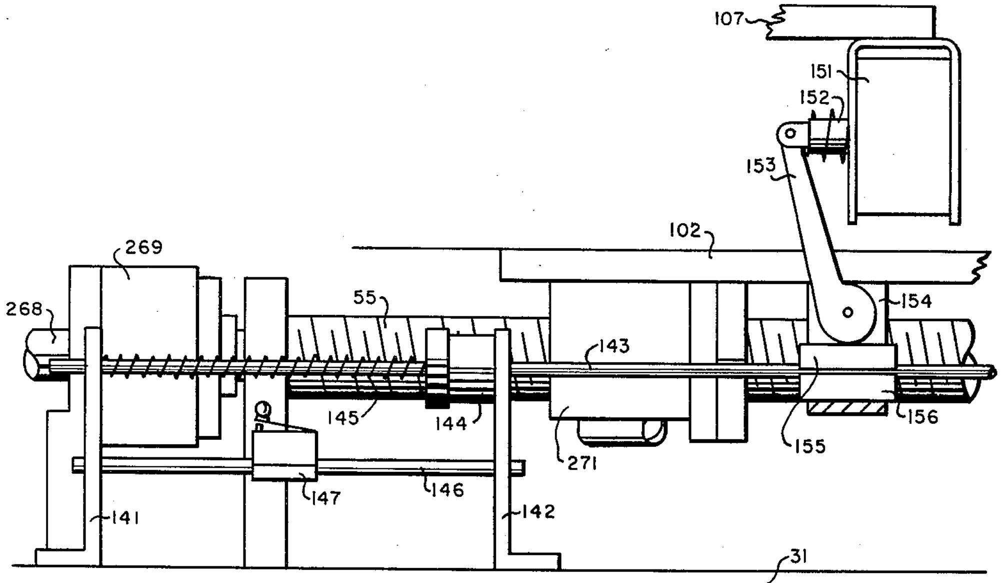
FIGURE 17 is an elevation view, similar to FIG. 7, but showing some parts which are hidden from view in FIG. 7.

Also shown in FIG. 7 is the outline of a clamp 148 which is mounted on the carriage and the lower end of which encircles the rod 143. FIG. 17 shows this clamp with some portions broken away or removed, and, as shown in FIG. 17, it can be seen that a solenoid 151 is mounted on the underside of the table-like portion 107 of the carriage. The core 152 is loosely pivoted to one end of a link 153 the other end of which is pivoted to a member 154 which in turn is fastened to the frame portion 102 of the carriage 49. The member 154 encircles the rod 143 and is formed with a large aperture into which two clamp members 155 and 156 are placed, above and below the rod 143 respectively. Each of the members 155 and 156 is formed with an approximately semi-circular groove having a radius equal to the radius of the rod 143.

The end of the link 153 pivoted to the member 154 is formed with a cam surface which engages the top of the clamp member 155. It is obvious from the drawing that when the solenoid 151 is energized the cam portion of the link 153 will urge the clamp members 155 and 156 into intimate contact with the rod 143, thus clamping the rod 143 to the carriage 49.

Figure 12:
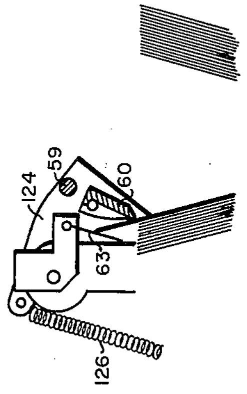
FIGURES 9–12 are fragmentary views, partly in section, taken on the same plane as FIG. 8, but showing the parts in various positions.
Figure 11:
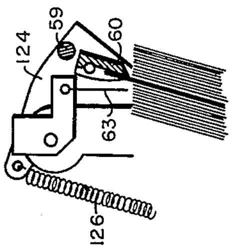
Figure 16:
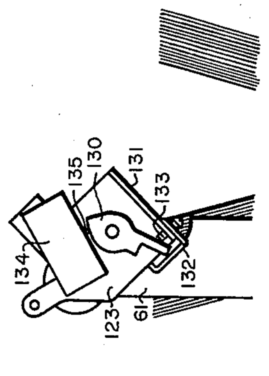
FIGURES 13–16 are fragmentary side elevation views, taken from the side visible in FIG. 2, and showing other parts of the apparatus in positions corresponding to the positions shown in FIGS. 9–12, respectively.
Figure 15:
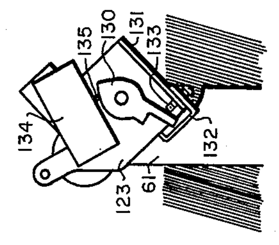

Returning now to the switch 134 (FIG. 15), actuation of this switch completes a circuit which energizes the solenoid 151 (FIG. 17) and causes the clamp 148 (FIGS. 7 and 17) to grip the rod 143 so that the rod 143 now moves backward with the carriage. As the carriage and the cards continue their backward movement the pack will be opened as shown in FIGS. 12 and 16. The cards do not fall forward after reaching the vertical position because of the strip of mohair previously discussed, but are pushed forward by the bar 60. When the pack is fully opened as shown in FIG. 12, the collar 144 (FIG. 7) which is fastened to the rod 143 actuates the switch 147 which in turn deenergizes the solenoid 127, thereby returning the brackets 123 and 124 to the position shown in FIGS. 1, 2, 7, 9 and 13, and at the same time deenergizes the motor 54 thereby stopping the carriage. The V-shaped opening between the cards will now be in the proper position as shown in FIG. 1 to allow individual cards to be abstracted from the file and viewed.

*Mounting of Moving Plates*

Referring now to FIG. 3, there can be seen the previously mentioned disc 71 which is mounted for rotation by a shaft which extends toward the rear of the apparatus and is not visible in FIG. 3. Mounted on the forward face of the disc 71 is a roller 161 which engages the horizontal portion of the yoke 72 so that as the disc 71 rotates, the yoke is driven up and down. The yoke 72 has two vertical portions to which are fastened two upright frame portions 162 and 163. The frame portion 163 is provided with two rollers 164 and 165 which roll on a stationary track 166 which in turn is supported by an upstanding post 167. The frame portion 152 is similarly provided with two rollers (not clearly visible in FIG. 3) which roll on a track 168 fastened to an upstanding post 169.

Two L-shaped brackets 171 and 172 are fastened to the upright portions 162 and 163 respectively and support two pipes or headers 173 and 174 which lead to the rear of the apparatus where they are connected to a system of valves, as will be more fully explained. The header 173 is pneumatically connected by means of flexible hoses 175 and 176 to the two forward plates 73 and 75 while the header 174 is connected by hoses 177 and 178 to the rear plates 74 and 76 (not visible in FIG. 3). All four hoses are shown broken away in FIG. 3 to permit other portions of the apparatus to be shown more clearly.

The upright portions 162 and 163 are connected at their lower ends to two generally triangular members 181 and 182 which in turn support the four plates 73, 74, 75 and 76 as will be more fully explained. A pair of uniform tension coil springs 183 and 184 are mounted on the upper ends of the upstanding posts 169 and 167, and have their ends fastened to the yoke 72 and are of such tension that the mass of the entire vertically moving assembly is counterbalanced.

Figure 18:
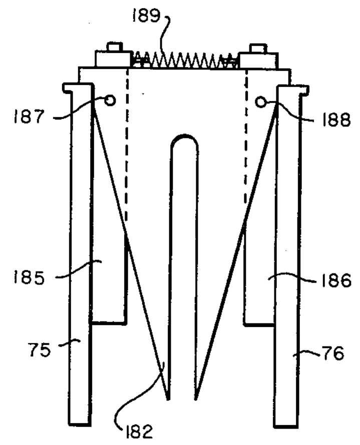
FIGURE 18 is a detail elevation view, showing two of the plates and their support.

Turning now to FIG. 18, there can be seen the generally triangular member 182 which supports the plates 75 and 76. The latter plates have posts 185 and 186 respectively fastened thereto which are in turn pivoted to the triangular member 182 by means of pins 187 and 188. The posts 185 and 186 each extend upward above the level of the top of the member 182 and a compression spring 189 is positioned between these posts as shown so as to urge the upper ends of the plates 75 and 76 away from each other which at the same time urges the lower ends into a V formation against the slanted surfaces of the plate 182.

FIG. 18 shows the plates 75 and 76 in the spread apart position, the same as in FIG. 3, and in order to be placed in this position, the urging of the spring 189 must be overcome. As shown in FIG. 3, a small L shaped bracket 191 has one arm fastened to the plate 75 while a small roller 192 is journaled on the other arm. A cam 193 is fastened to the vertical track 168 at the level of the platen 77 in the path of vertical movement of the roller 192. As is obvious from FIG. 3, the roller 192 engages the cam 193 only when the plate 75 is adjacent to the platen 77 and at this time the roller 192 rotates the plate 75 about its pivot 187 against the urging of spring 189 to a vertical position as shown, while when the plate 75 is above or below the platen 77, the roller 192 does not engage the cam 193 and the spring 189 pushes the plate 75 against the slanted edge of the triangular plate 182 to the position shown in FIG. 1.

The plates 73 and 74 are pivoted to the triangular plate 181 in the same manner as plates 75 and 76 are pivoted to the plate 182. Also, each of the plates 73, 74 and 76 is provided with a roller similar to the roller 192 and each of these rollers cooperates with a cam similar to the cam 193.

*Platen Motion*

Figures 21, 22:
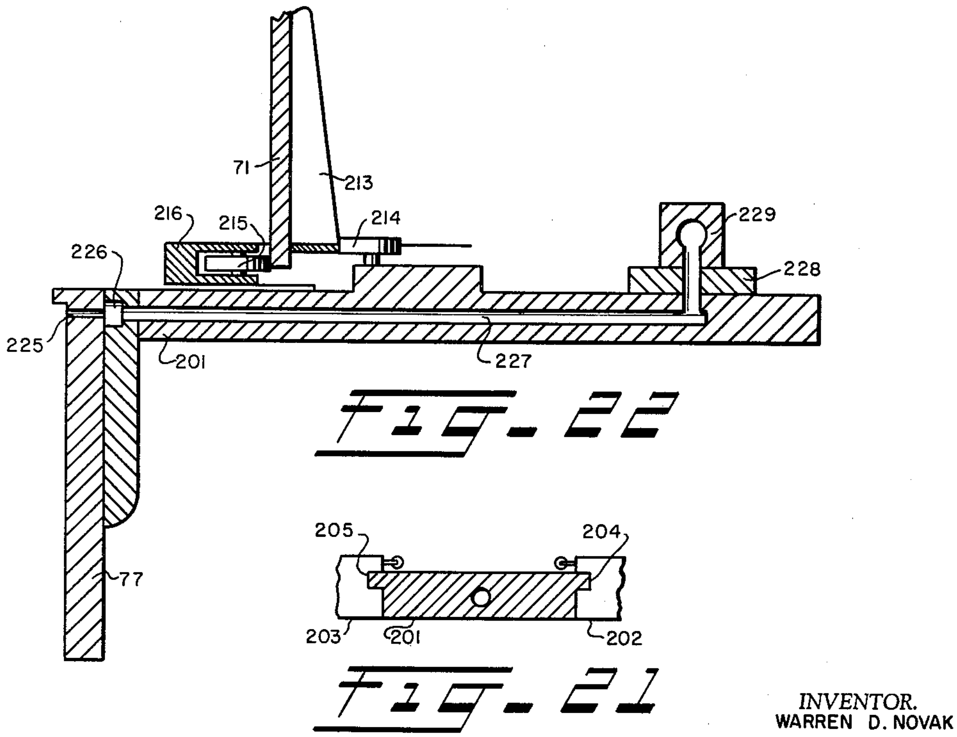
FIGURE 21 is a cross sectional view, taken on the plane 21—21 of FIG. 20.
FIGURE 22 is a cross sectional view, taken on the plane 22—22 of FIG. 20.

Each rotation of the disc 71 not only causes the plates 73–76 to move downward and upward but also causes the platen 77 to move horizontally at the same time. As can be seen in FIGS. 1 and 3, but as better shown in FIGS. 19 and 20, the platen 77 is rigidly fastened to a generally rectangular rearwardly extending plate 201 which is supported on its edges by two stationary frame members 202 and 203. As best shown in FIG. 21, the plate 201 is formed with two projections 204 and 205, one on each side, which fit into corresponding slots in the frame members 202 and 203 thereby enabling the plate 201 and the platen 77 to slide forward and backward. As shown in FIG. 20, a pair of tension springs 206 and 207 are connected between horizontally extending pins 208 and 209 on the frame members 202 and 203 and vertically extending pins 211 and 212 on the plate 201 thereby urging the plate 201 and the platen 77 forward.

Figure 19:
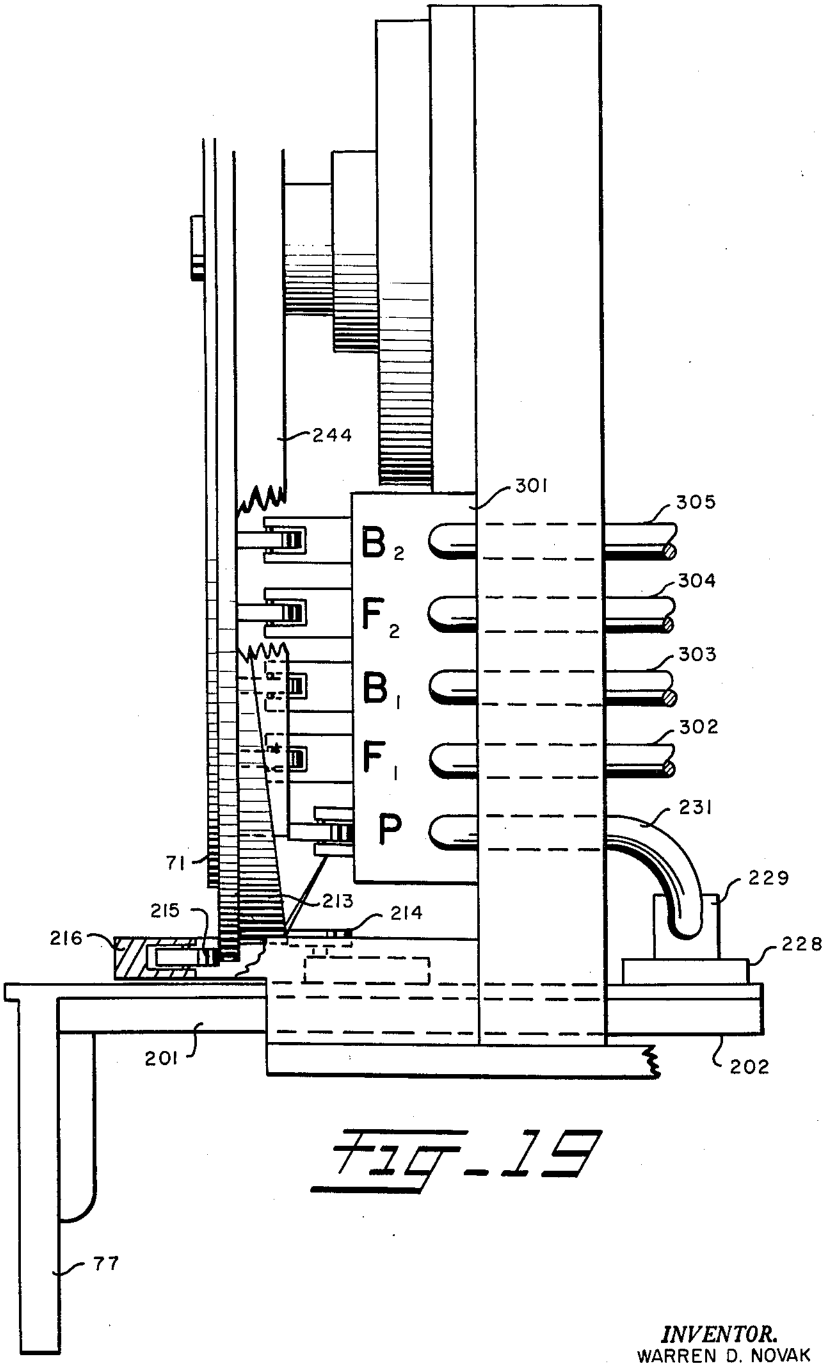
FIGURE 19 is a partial side elevation view, showing the platen mounting and the cam operated valves.
Figure 20:
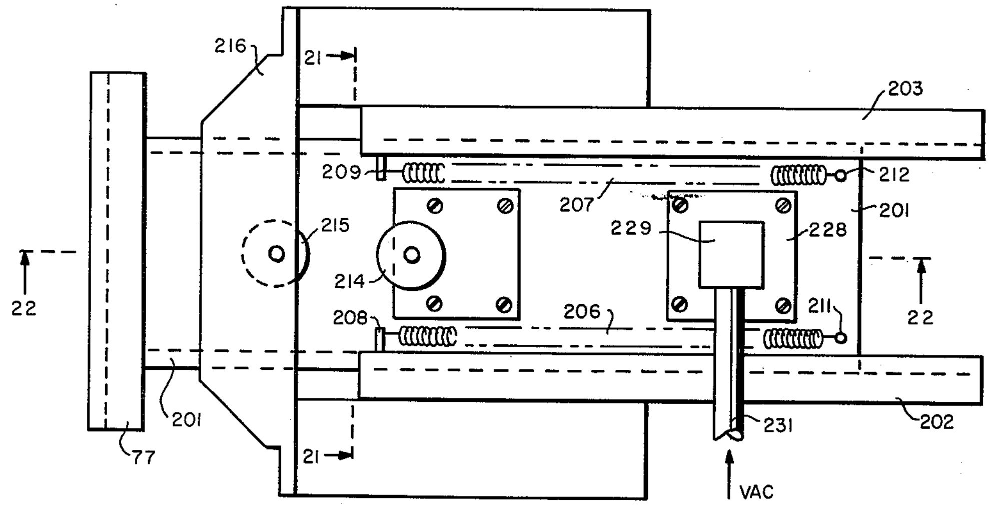
FIGURE 20 is a plan view of the platen and its mounting.

As best shown in FIGS. 19 and 22, the disc 71 is provided with a cam 213 which cooperates with a roller 214 mounted on the plate 201. Since the roller 214 is urged forward into contact with the cam 213 by the springs 206 and 207, the angular position of the disc 71 determines the position of the platen 77. Any tendency of the disc 71 to move forward is prevented by a roller 215 mounted on a stationary portion 216 of the frame which roller bears against the forward surface of the disc 71.

*Grooves and Apertures in Plates*

Figure 23:
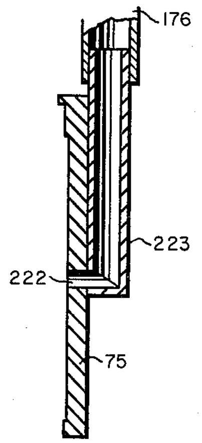
FIGURE 23 is a cross sectional view of one of the plates.

As previously mentioned, each of the plates 73, 74, 75 and 76 is formed with a series of depressed areas, or grooves, in one face. The plate 75 is typical, and, as shown in FIG. 3, has three longitudinal grooves 221 about 0.020 inch deep which are interconnected by short horizontal grooves. At the center of the groove nearest the platen 77 is a small aperture 222 extending through the plate 73 and which, as shown in FIG. 23, communicates with a pipe 223 on the back side which in turn is connected to the hose 176.

The arrangement of the depresion and the orifice has been found to be important. The standard library file drawer has sloping ends so that when the pack of cards is broken open the cards normally make an angle of approximately fifteen degrees with the vertical. The sloping edges of the triangular plates 181 and 182, FIGS. 3 and 18, make an angle of thirty degrees with each other and the forward and back plates therefore each are inclined fifteen degrees to the vertical as they enter the opening in the pack. However, cards actually encountered in files are stored with a density which is anything but uniform so that when the pack is opened the actual angle between the cards and the vertical may vary considerably in either direction from the expected fifteen degrees and the angles made by the forward and backward sloping portions may be different. Therefore when the plates 73–76 enter the opening they may press tightly against the face card or may actually be spaced therefrom. Little difficulty is experienced in picking up the face card when it presses against a plate but when the card and plate are spaced apart the card must be "pulled" across the gap to the plate. When there is no card against the plate, the grooves have little or no effect and the flow of air into the aperture 222 creates a reduced pressure area of small cross section which extends a substantial distance away from the plate and is sufficient to "pull" a card across any gap which has been encountered during a long period of testing. If there were no grooves the card would be drawn against the plate satisfactorily but it would then be held there by pressure at one point only and would tend to slip or twist. However, with the present construction as soon as a card is drawn against the plate, the reduced pressure area is spread over the entire area of the grooves and is effective to hold the card securely.

*Grooves and Orifices in Platen*

As shown in FIG. 3, the platen 77 is also formed with a plurality of longitudinal grooves such as the groove 224 each about 0.040 inch deep extending from near the bottom to near the top but these grooves are not interconnected as are those of the plate 75. Instead, there is a small orifice such as orifice 225 at the top of each groove and these orifices are interconnected through an internal lateral hole 226 (see FIG. 22) in the platen. The platen 77 may be formed in two parts, as shown, in which case the hole 226 is originally formed as a groove in the rear portion in such a position as to be in registry with the orifices 225 in the front part. The hole 226 in turn communicates with a horizontal passageway 227 in the rearwardly extending plate 201. The passageway 227 communicates with a vertical passageway extending through the plate 201, a block 228, and a collar 229, the latter making a pneumatic connection with a flexible hose 231 (FIGS. 19 and 20), which leads to a valve, the operation of which will be explained subsequently.

The arrangement of grooves and orifices on the face of the platen is very important because it eliminates any tendency for the card to be transferred to the platen too soon. Consider the situation after the plates 73 and 75 have entered the opening and are returning upward with a card. As the plates 73 and 75 rise they are spread apart to the vertical position by the cams and rollers (such as cam 192 and roller 193, FIG. 3), and at the same time the platen 77 moves forward. Sometime before the plates 73 and 75 have risen to the level shown in FIG. 3, the platen 77 will make contact with the card. However, the grooves are ineffective at this time even though air may be flowing into the orifices 225 and there is no tendency for the card to be transferred to the platen. It is not until the plates 73 and 75 raise the card high enough so that the top edge partially closes the orifices 225 that there is any tendency to transfer the card. As the card rises further, the lip on the platen 77 engages the top edge of the card thereby preventing the card from rising further. As the plates 73 and 75 continue to rise, they leave the card behind on the platen and the flow of air through the orifices 222 is cut off. The orifices 225 in the platen are now completely covered and the grooves 224 become effective to distribute the low pressure over the entire area of the grooves thereby holding the card securely in the proper position.

Consider now the operation of transferring a card from the platen 77 to the plates 73 and 75. Let it be assumed that there is a card on the platen 77, the plates 73–76 are at their upper limit (as shown in FIG. 1) and that the disc 71 has just started to rotate in the proper direction to cause the plates 73 and 75 (rather than the plates 74 and 76) to pick the card off the platen. As the plates 73 and 75 descend, the platen 77 moves forward from its median position toward the position shown in FIG. 3, the plates 73 and 75 are pushed by the rollers (such as roller 192) toward the position shown in FIG. 3, air is drawn through the orifices 222 in the plates 73 and 75, and the plates make contact with the card on platen 77. Soon the lips on the upper edges of the plates 73 and 75 engage the upper edges of the card, forcing it downward. The card need descend but a short distance to uncover the orifices 225 in the top of the platen thereby rendering the flow of air therethrough ineffective. Shortly after the orifices 225 are completely uncovered, the previously mentioned valve system cuts off the flow of air through these orifices. The placement of the orifices and the use of the lips thus makes the timing of the various valve operations far less critical than would otherwise be the case and assures the transfer of the card to plates 73 and 75 without any tendency to stick to the platen 77 once the orifices are uncovered.

*Disc Drive Mechanism*

Figure 24:
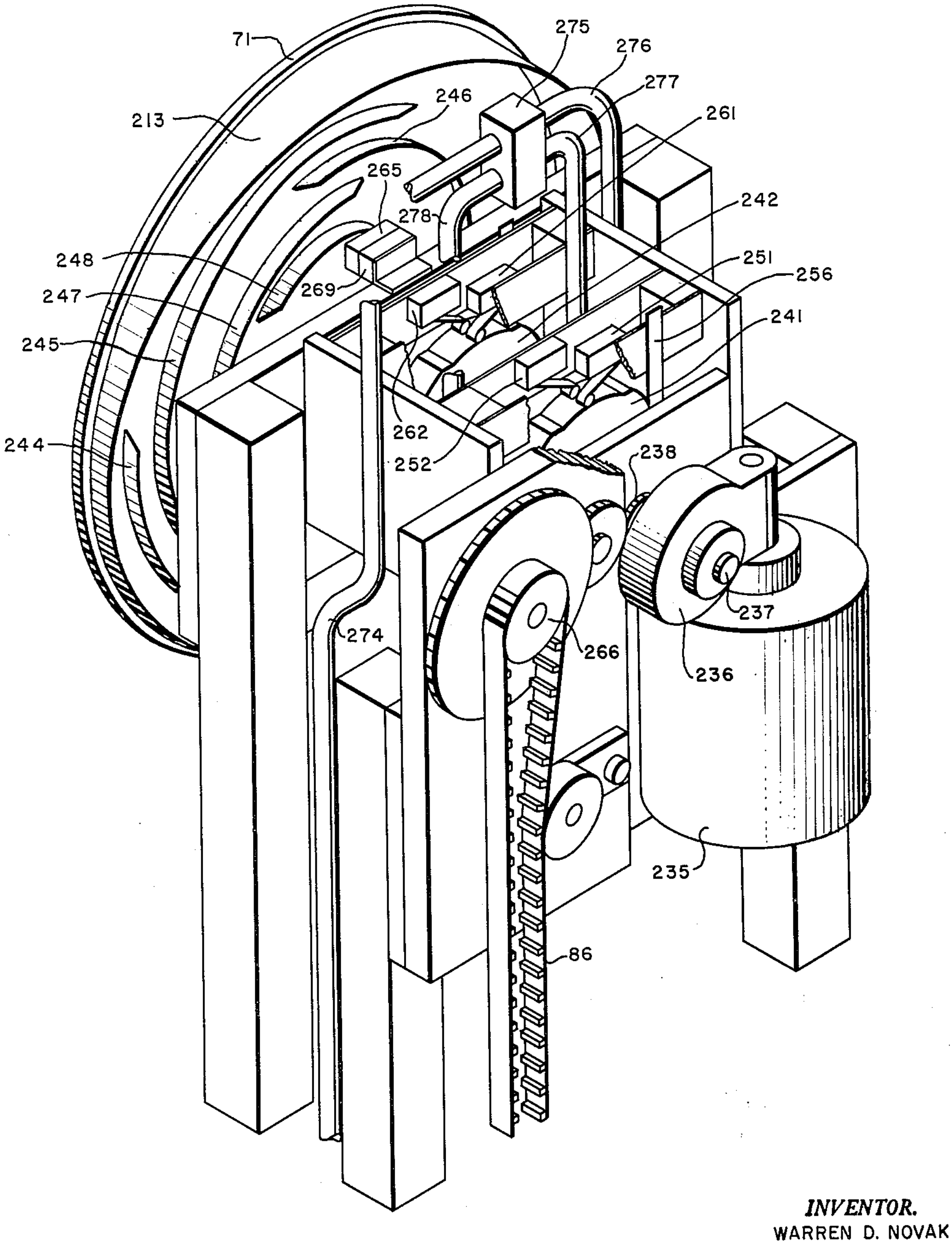
FIGURE 24 is a pictorial view of the upper rear portion of the apparatus.

Turning now to FIG. 24, there is shown an electric motor 235 equipped with a right angle gear reduction drive mechanism 236 which drives a shaft 237 on which are mounted a pinion 238, three wheels 241, 242 and 243, (the wheel 243 not being visible in FIG. 24, see FIG. 27) and the disc 71 which has six cams, the previously mentioned cam 213 and five additional cams 244, 245, 246, 247 and 248 on its rear face for controlling the position of the platen 77 and the flow of air through the plates 73–76 and the platen 77 as will be more fully explained.

The wheel 241 has a detent in its top surface which cooperates with the actuators of two small micrometer switches 251 and 252. When the wheel 241 is rotated sufficiently from the position shown in FIG. 24, both switches will be operated at substantially the same time.

Figure 26:
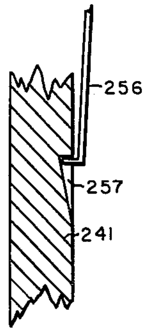
FIGURE 26 is a fragmentary cross sectional view of the wheel shown in FIG. 25.
Figure 25:
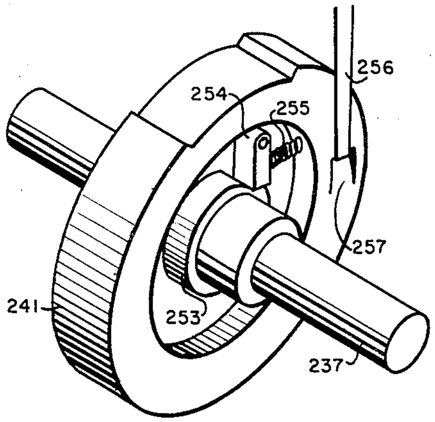
FIGURE 25 is a pictorial view of one of the wheels partially visible in FIG. 24.

The wheel 241 is not fastened rigidly to the shaft 237, but, as best shown in FIG. 25, is provided with a ratchet stop mechanism comprising a single tooth ratchet wheel 253 fastened to the shaft 237 and a pawl 254 pivotally fastened to the wheel 241 and urged by a spring 255 into engagement with the ratchet wheel 253. It is obvious from the drawing that, when the shaft 237 is rotated counterclockwise as viewed in FIGS. 24 and 25, the wheel 241 will be driven by the shaft 237 but when the shaft is rotated clockwise, the pawl 254 and the wheel 241 will not be driven. A dog 256 cooperates with a detent 257 in the wheel 241, as more clearly shown in FIG. 26, to positively prevent clockwise rotation of the wheel 241.

The wheel 242 also has a detent in its top surface and two small switches 261 and 262 cooperate therewith so as to be actuated substantially simultaneously when the wheel 242 is rotated sufficiently. The wheel 242 is also provided with a ratchet stop mechanism (not shown), similar to that of the wheel 241, except that clockwise rotation of the shaft 237 rotates the wheel 242 clockwise while counterclockwise rotation of the wheel 242 is prevented.

The wheel 243 (shown in plan view in FIG. 27) is rigidly fastened to the shaft 237 and rotates therewith regardless of the direction of rotation. This wheel is also formed with a detent on its top surface, broader than the detent on wheels 241 and 242, and two small micrometer switches 264 and 265 cooperate therewith.

The switches 251 and 252 associated with the wheel 241 and the switches 261 and 262 associated with the wheel 242 are for completing an auxiliary circuit so that, once the wheels are rotated sufficiently to actuate these switches, the motor 235 will remain energized even if the manually operated toggle 43 (FIG. 1) be released after momentary operation. The switches 264 and 265 associated with the wheel 243 are for deenergizing the motor 235 and applying dynamic braking so as to stop the motor 235 and the disc 71 in the neutral position shown in FIGS. 24 and 27. The operation of all six of these switches will be explained more fully in connection with the circuit diagram, FIG. 32.

*"Inching" Mechanism*

Returning to FIG. 24, the pinion 238 on the shaft 237 is part of a reduction gear train which drives a sprocket 266 at a reduced speed. The sprocket 266 in turn drives the toothed belt 86 which, as best shown in FIG. 28, is guided by several idler rollers and drives a sprocket 267 fastened to a shaft 268 (located under the carriage 49). The shaft 268 is connected to the lead screw 55 through an electrically controlled clutch 269 which is so controlled as to allow the shaft 268 to drive the lead screw 55 yet to prevent the lead screw 55 from driving the shaft 268. As previously mentioned, this arrangement causes the longitudinal position of the carriage 49 to be adjusted by approximately the thickness of one card each time the disc 71 makes one revolution.

Also visible in FIG. 28 is a nut 271 encircling the lead screw 55 and fastened to the under side of the carriage 49. The carriage 49 is not shown in FIG. 28, but the nut 271, which may be of the travelling ball type, may be seen in FIG. 17 fastened to the frame portion 102 of the carriage 49.

*Forward and Backward Valve Control*

Returning to FIG. 24, there is shown a main pipe 274 which leads downward to the intake side of the previously mentioned fan (not shown in FIG. 24). The main pipe 274 is connected to a distribution chamber 275 which serves to interconnect all of the pipes connected to it. One pipe 276 leads from the chamber 275 downward to a valve which controls the flow of air through the platen 77. Another pipe 277 leads downward to a valve controlled by the wheel 242 while yet another pipe 278 leads downward to a valve controlled by the wheel 241.

Figure 29:
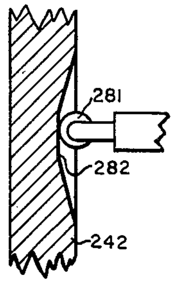
FIGURE 29 is a fragmentary cross sectional view of a detent in one of the wheels shown in FIG. 27.
Figure 27:
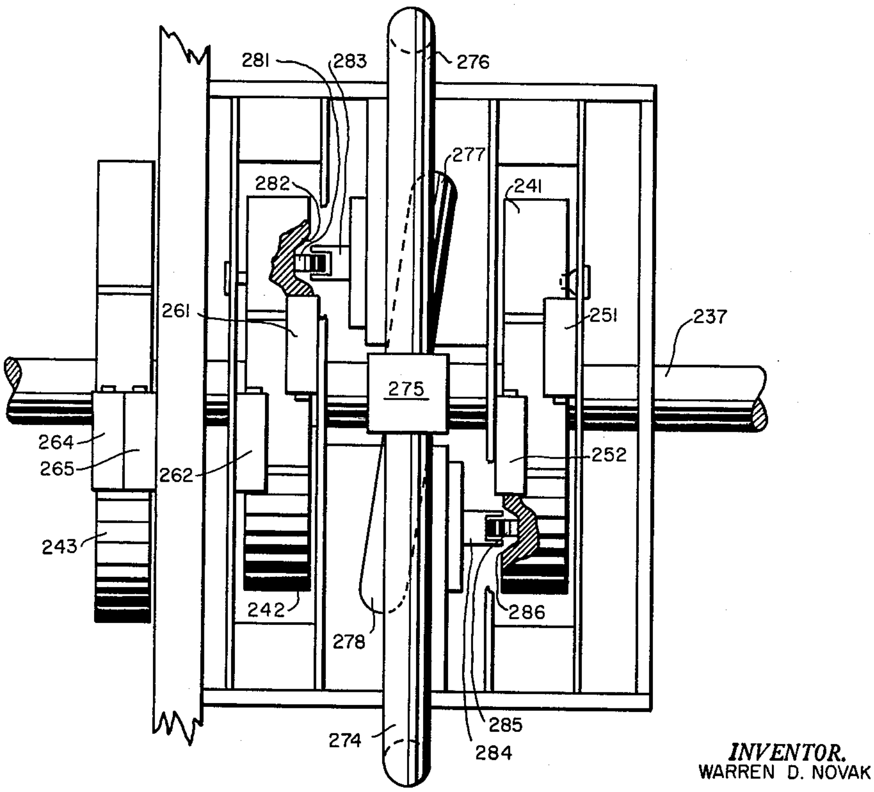
FIGURE 27 is a plan view of a portion of the apparatus shown pictorially in FIG. 24.

Turning now to FIG. 27, there can be seen the above mentioned pipes 274, 276, 277 and 278 as well as the distribution chamber 275. There can also be seen a roller 281 resting in a detent 282 formed on one face of the wheel 242. As shown in FIG. 29, the detent 282 is quite small so that the wheel 242 need turn but a few degrees from the position shown to force the roller 281 out of the detent and onto the planar surface of the wheel 242.

The roller 281 operates a valve 283, only the outline of which is shown, the inlet side of which is connected to the pipe 277. With the wheel 242 in its neutral position as shown and the roller 281 in the detent 282, the valve 283 is closed but in all other positions of the wheel 242 the valve 283 is open.

There is also shown a valve 284 the inlet of which is connected to the pipe 278 and which is operated by a roller 285 which cooperates with a detent 286 in the wheel 241. The detent 286 is similar to the detent 282, and the valve 284 is closed while the wheel 241 is in the neutral position shown, but is open at all other positions.

*Forward and Backward Operation*

Before considering the operation of the various valves in detail, it is well to examine more closely the two modes of operation of the card handling apparatus, that is, forward and backward operation. Returning for a moment to FIG. 1, it will be recalled that it has been stated that the apparatus is capable of either abstracting the face card of the rearwardly sloping group and placing it on the platen, or abstracting the face card of the forwardly sloping group and placing it on the platen. The former mode of operation is herein referred to as the Forward Direction of operation and is also referred to as the Number 2 Direction.

At the start of operations, the parts are in the positions shown in FIG. 1. One cycle of Forward Direction operation (No. 2 Direction) is initiated by operation of the "card" toggle 43 to the "Forward" position which operation completes a circuit which energizes the motor 235 (FIG. 24) so as to rotate the disc 71 clockwise as viewed in FIG. 1. The plates 73, 74, 75 and 76 start to descend, the platen 77 moves forward (under the urging of springs 206 and 207, FIG. 20, as permitted by the cam 213, FIG. 22), and when the disc 71 has rotated ninety degrees, the front plates 73 and 75 will be adjacent to the platen 77, as shown in FIG. 3. These plates now pick off any card which may be on the platen and carry it downward, and when the disc 71 has been rotated through one hundred and eighty degrees, the plates will be in the opening between the groups of cards. The front plates 73 and 75 now release their card, depositing it on the forward sloping group, while the back plates 74 and 76 pick up a card from the backwardly sloping group and raise it. As the plates rise, the platen 77 moves backward and when the disc 71 has been rotated through two hundred and seventy degrees, the rear plates 74 and 76 will be adjacent to the platen and the card will be transferred to the platen. As the disc 71 is further rotated, the platen moves forward and the plates rise until at the three hundred and sixty degree position of the disc 71, the parts will have returned to the position shown in FIG. 1, with the platen at the viewing position, intermediate the forward and backward limits.

Consider now the operations taking place at the rear of the apparatus during the Forward, or Number 2, Direction of operation. Referring to FIG. 24, the shaft 237 and the disc 71 rotate counterclockwise as viewed in this figure during Forward operation. The wheel 242 remains stationary while the wheel 241 (see also FIG. 25) rotates with the shaft 237. After a few degrees of rotation, the valve 284 (FIG. 27) is opened, permitting air to be drawn therethrough, and the switches 251 and 252 operate. The wheel 243 (FIG. 27), being rigidly fastened to the shaft 237, also rotates and the switches 264 and 265 are actuated. After three hundred and sixty degrees of rotation of the disc 71, the parts are returned to the positions shown in FIGS. 24 and 27.

Returning to FIG. 1, the apparatus may also be operated to abstract the face card of the forwardly sloping group and to place it on the platen. Such operation is herein referred to as the Backward Direction of operation and is also referred to as the Number 1 direction. One cycle of the Backward, or Number 1, Direction of operation is initiated by operating the "card" toggle 43 in the Backward Direction which causes the disc 71 to rotate counterclockwise as viewed in FIG. 1. During the first ninety degrees of rotation, the platen 77 moves backward as the plates 73–76 descend until the platen and the back plates 74 and 76 are adjacent. Next, any card on the platen 77 is transferred to the back plates 74 and 76 which deposit it as the face card of the backward sloping group at the one hundred and eighty degree point. Next, the front plates 73 and 75 pick up the face card of the forwardly sloping group and transfer it to the platen, which has now moved forward, at the two hundred and seventy degree point. Finally, the parts return to the position shown in FIG. 1.

At the rear of the apparatus, the shaft 237 and the disc 71 rotate clockwise, as viewed in FIG. 24, during the Backward, or Number 1, Direction of operation. The wheel 242 rotates, operating the switches 261 and 262 and the valve 283 (FIG. 27), while the wheel 241 remains stationary. As before, the wheel 243 rotates, actuating switches 264 and 265.

*Platen and Plate Valves*

The operation of the various valves which control the flow of air through the plates 73–76 and the platen 77 may now be considered in more detail. Referring to FIG. 19, there can be seen the framework 301 enclosing five plunger operated valves designated $B_2$, $F_2$, $B_1$, $F_1$, and P. The symbol B means that the valves so designated control the flow of air through the Back plates 74 and 76; the symbol F means that the valves so designated control the flow of air through the Front plates 73 and 75; and the symbol P refers to the Platen 77. The subscripts 1 and 2 refer to the Number 1 (Backward) and Number 2 (Forward) Directions of operation respectively. The valves $B_2$, $F_2$, $B_1$, $F_1$, and P are operated by the cams 248, 247, 246, 245 and 244 respectively on the disc 71, the first four of which have been omitted from FIG. 19 in the interest of clarity. There can also be seen the tubes 231, 302, 303, 304 and 305 connected to one side of each of the valves, the connections to the other side of each being on the side of the apparatus which is hidden from view in FIG. 19. All of the connections will be explained with the aid of the schematic diagram, FIG. 30.

Figure 30:
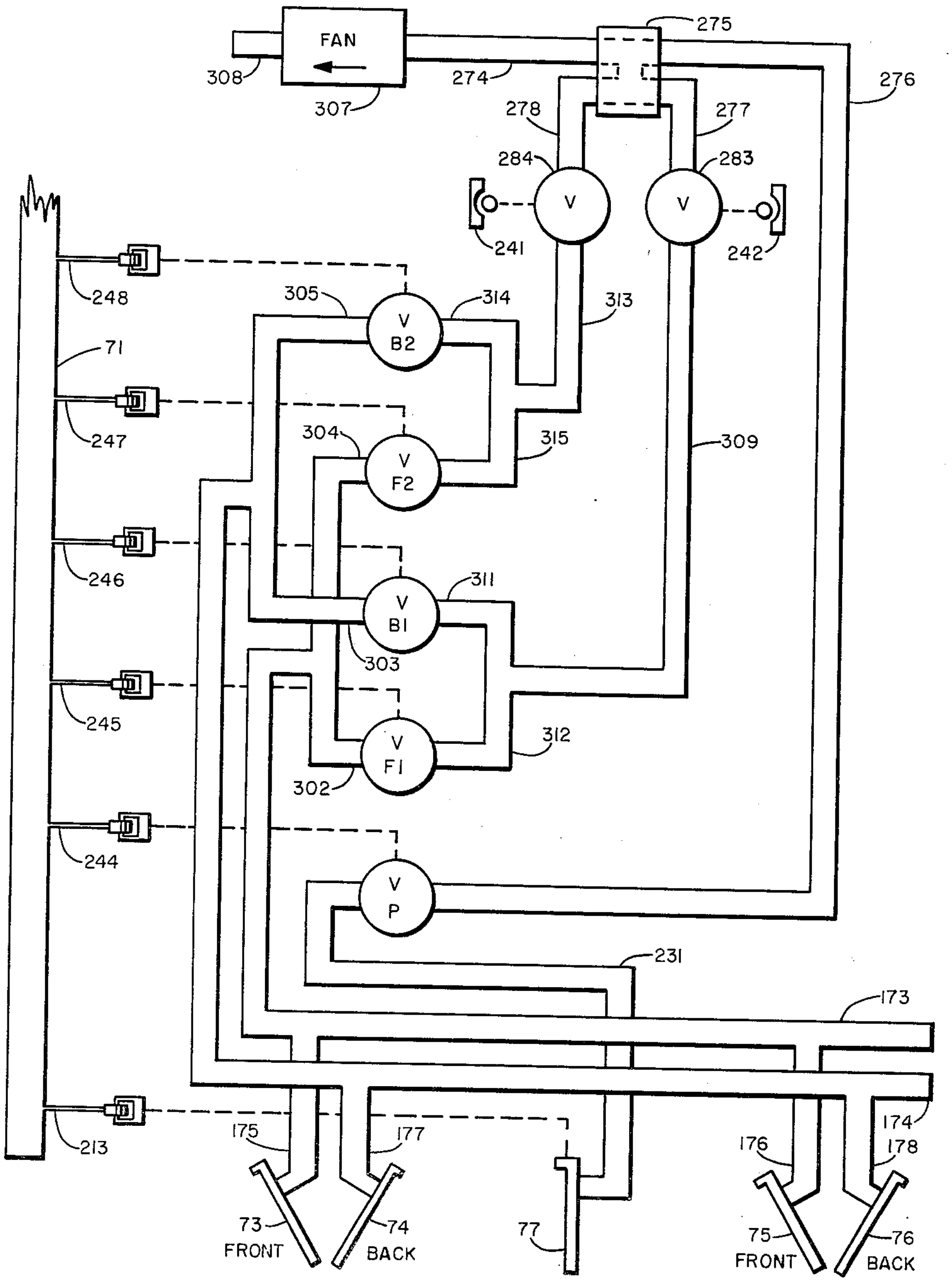
FIGURE 30 is a diagram of the air flow and air control system.

Turning now to FIG. 30, there is shown an air fan 307 which operates continuously to draw air from the pipe 274 and exhaust it through the pipe 308. The pipe 274 is connected to the previously mentioned distribution chamber 275 which permits the fan 307 to draw air from pipes 276, 277 and 278 simultaneously. The pipe 276 is connected to one side of the plunger operated valve P, the other side of which is connected through the flexible hose 231 to the platen 77.

The pipe 277 is connected to one side of the valve 283 which, it will be recalled, is operated by the wheel 242. The other side of the valve 283 is connected through pipes 309, 311 and 312 to one side of each of the valves $B_1$ and $F_1$. The pipe 278 is similarly connected to one side of the valve 284 which is operated by the wheel 241. The other side of the valve 284 is connected through pipes 313, 314 and 315 to one side of each of the valves $B_2$ and $F_2$.

The other sides of the valves $F_1$ and $F_2$ are connected through pipes 302 and 304 respectively to the previously mentioned header 173 (also shown in FIG. 3) which in turn is connected through hoses 175 and 176 to the front plates 73 and 75 respectively. Similarly, the other sides of the valves $B_1$ and $B_2$ are connected through pipes 303 and 305 respectively to the header 174 which in turn is connected through hoses 177 and 178 to the back plates 74 and 76 respectively.

There can also be seen in FIG. 30 a schematic representation of the disc 71 and its cams 244, 245, 246, 247, and 248 which control the operation of the valves P, $F_1$, $B_1$, $F_2$, and $B_2$ respectively. Also shown is the cam 213 on the disc 71 which controls the position of the platen 77.

*Position and Air Flow Control of Plates and Platen by Disc 71*

It is obvious from the description up to this point that the operation of all parts of the individual card handling apparatus is controlled by the shaft 237 and the disc 71 which rotates therewith. One revolution of these parts corresponds to one cycle of operation, whether operation be in the Forward Direction or the Backward Direction. Selection of Forward or Backward operation is made simply by selecting the direction of rotation of the motor 235, and once this selection has been made, the angular position of the disc 71 determines the position of the plates 73–76, the position of the plate 77, and the flow of air through plates and platen. The control of the various parts can best be understood by reference to FIG. 31, which is a chart showing the position of the plates, the position of the platen, and the control of the air flow through plates and platen as a function of angular position and direction of rotation of the disc 71.

Figure 31:
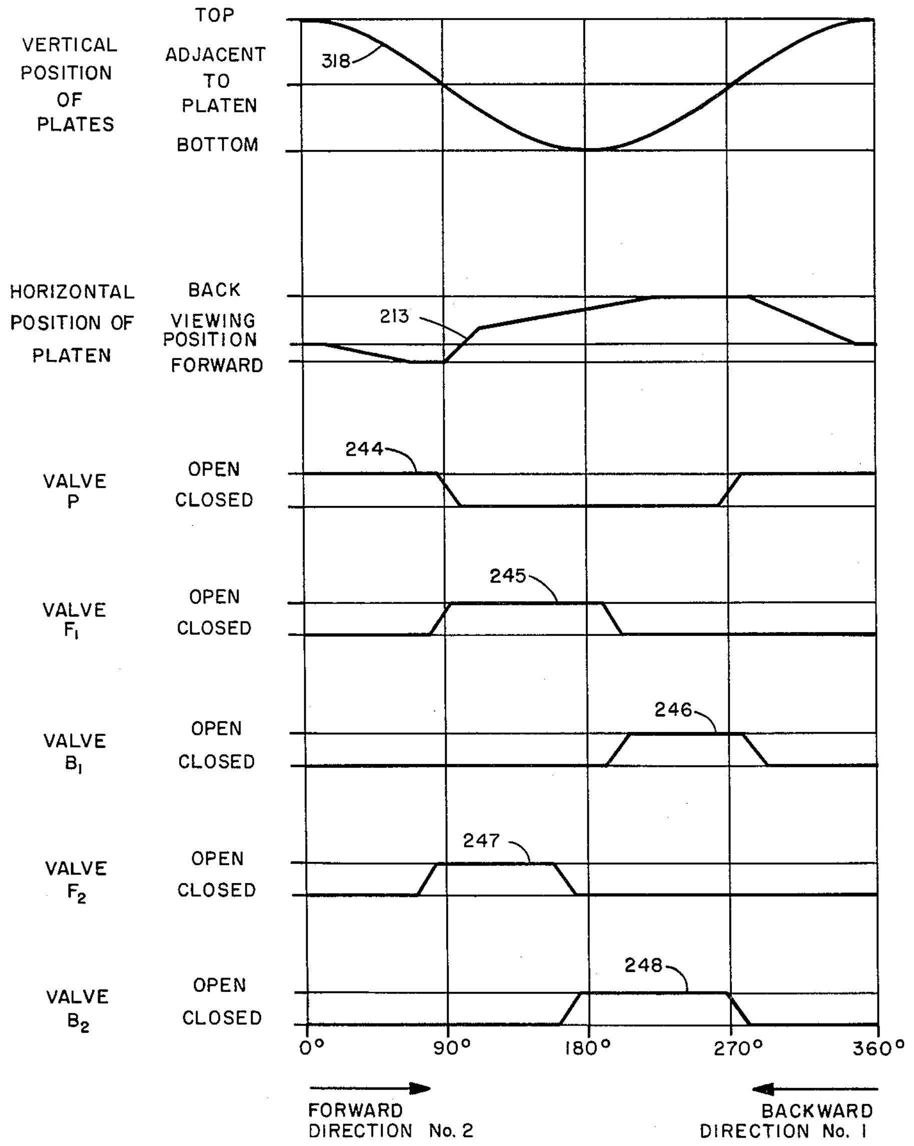
FIGURE 31 is a diagram showing the correlation among plate position, platen position, and air flow.

Referring now to FIG. 31, the abscissa is the angular position of the disc 71. The top curve, designated 318, is a cosine curve representing the vertical position of the plates 73–76. The remaining curves are developed views of the cams 213 and 244–248, showing the height of each as a function of its angular position on the disc 71. The zero and three hundred and sixty degree positions are, of course, identical, and represent conditions as viewed in FIG. 1, with the platen 77 in viewing position and the plates 73–76 at their upper limit of travel. Forward operation is depicted by assuming that all of the cam followers, or rollers, move in unison to the right from the zero position toward the three hundred and sixty degree position, while Backward operation is depicted by assuming that the rollers move to the left from the three hundred and sixty degree position toward the zero position.

Consider first the operation in the Forward, or Number 2, Direction of operation. The plates 73–76 are at their upper limit (as shown in FIG. 1) at the start and as the disc 71 starts to rotate clockwise as viewed in FIG. 1, the yoke 72 and the plates move downward as shown by the curve 318, FIG. 31. When the disc 71 has rotated through ninety degrees the plates will be half way down, adjacent to the platen 77. When the disc 71 reaches its one hundred and eighty degree position the plates are in the V shaped opening in the pack of cards. Further rotation of the disc 71 brings the plates up again, to the level of the platen at the two hundred and seventy degree position, and finally to their original position at the end of the cycle.

The platen 77 starts its cycle in the viewing position and at this point the cam 213 has a flat portion, half of which appears at the left in FIG. 31 and the other half of which appears at the right, so that the angular position at which the disc 71 stops is not critical. As the disc rotates from the zero position toward the ninety degree position, the platen 77 moves forward, following the surface of the cam 213, reaching its most forward position, adjacent to the forward plates 73 and 75, at approximately the seventy degree position of the disc 71. The cam 213 has another flat spot at this point so that the platen remains stationary until the ninety degree position is reached, when it starts moving backward, rapidly at first, then more slowly, reaching its most backward position at approximately two hundred and twenty degrees. Another flat spot on the cam 213 causes the platen to remain stationary until the disc 71 reaches approximately the two hundred and eighty degree position, when it starts moving forward, reaching the viewing position at approximately three hundred and fifty degrees and staying there for the remainder of the cycle.

At the start of the cycle, the valve P is open, the platen 77 is connected to the fan 307, and the card is held in position. At approximately eighty five degrees the cam 244 starts to close the valve P, completing the closing operation at approximately one hundred degrees. The valve remains closed until the cam 244 starts to reopen it at approximately two hundred and sixty degrees, completing the opening at approximately two hundred and seventy-five degrees, and holding it open for the remainder of the cycle.

In the Forward Direction which is now being considered, the valve 284 (FIG. 30) is open but the valve 283 is closed so valves $B_1$ and $F_1$ have no effect and need not be considered at this time. The valves $F_2$ and $B_2$ are both closed at the start. At approximately seventy degrees, the cam 247 starts to open the valve $F_2$, completing the process at approximately eighty degrees, so that the forward plates 73 and 75 can pick the card off the platen 77 at the ninety degree position. The valve $F_2$ remains open, carrying the card downward, until, at approximately one hundred and fifty-five degrees, the cam 247 starts to close it. Closure is completed at about one hundred and seventy degrees, just before the plates reach the bottom of the V shaped opening. This slight "lead," or advance operation, has been found desirable to assure proper release of the card as the plates reach the bottom of the V shaped opening. The valve $F_2$ stays closed for the remainder of the cycle.

The valve $B_2$, controlling the flow of air to the back plates 74 and 76, is closed at the start of the cycle. At approximately one hundred and sixty degrees, the cam 248 starts to open the valve, completing the process at about one hundred and seventy degrees, just before the lower limit of travel is reached. Here, again, a "lead" in valve operation has been found desirable to assure reliable pickup of the card from the pack. At the one hundred and eighty degree position the plates start rising, and just a few degrees before the two hundred and seventy degree position is reached, the cam 248 starts the closing operation, completing it at about two hundred and eighty degrees. The valve $B_2$ remains closed for the rest of the cycle.

The Backward, or No. 1, Direction of operation, is quite similar. The vertical motion of the plates 73–76 is identical, as can be seen from the symmetry of the curve 318. The platen motion, however, is different. Starting at the three hundred and sixty degree position, the platen 77 first moves back, reaching its most backward position at about two hundred and eighty degrees and remaining there until the two hundred and twenty degree position is reached, as is clear from the showing of the flat spot on the cam 213. As the disc 71 rotates further, the platen 77 moves to its forward position, where it remains from ninety degrees to about seventy degrees, and then returns to the viewing position.

In the Backward Direction the valves $F_1$ and $B_1$ are active. The cam 246 opens the valve $B_1$ as it rotates from two hundred and ninety degrees to about two hundred and seventy-five degrees, and closes the valve as it goes from about two hundred and five degrees to one hundred and ninety degrees. The "lead" in valve operation can also be noted here.

The cam 245 starts to open the valve $F_1$ at about two hundred degrees, completing the opening around one hundred and eighty-seven degrees. The valve is closed by the cam 245 in the interval between about ninety-seven and about eighty degrees.

It will be understood that the showing of the cams in FIG. 31 is somewhat schematic since the cams are arranged concentrically on the disc 71 and therefore have different linear lengths. However, the angular dimensions shown are quite accurate and represent the contours of a set of cams which have been found to provide reliable operation.

*Electric Circuit Diagram*

Figure 32:
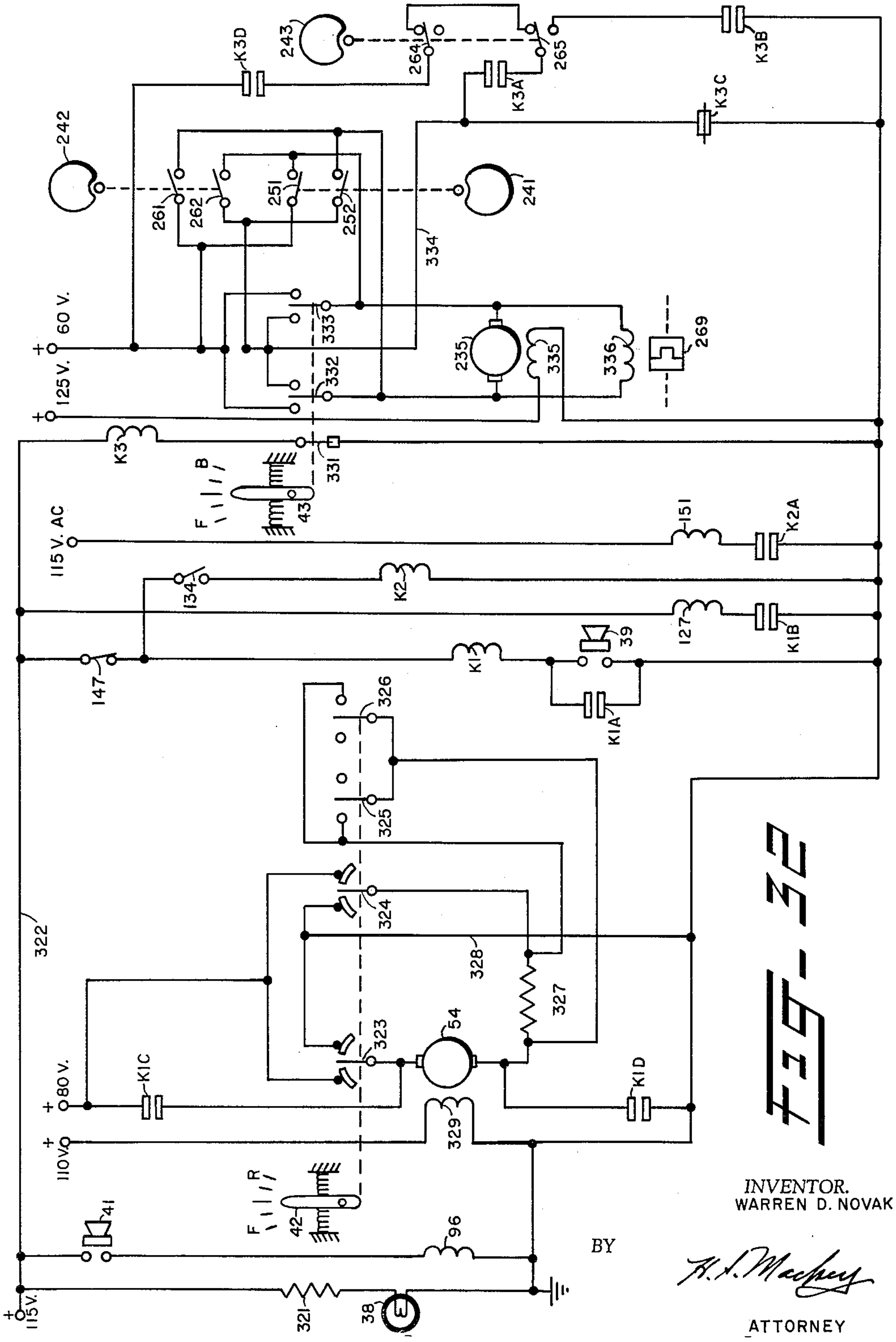
FIGURE 32 is a schematic diagram of the electric connections.

Turning now to FIG. 32, there is shown the electric circuit employed to control the various motors, solenoids, etc., so as to operate in the manner previously discussed. The motors 54 and 235 are direct current motors and each is provided with a separate source of field and armature current, each field winding being energized at all times. The voltages shown in the drawing are, of course, merely illustrative, and represent values found to be proper for the particular motors used to obtain suitable speed and torque characteristics. The principal source of control power is 115 volts D.C., although one solenoid is of the alternating current variety and is shown energized by 115 volts A.C. The details of the circuit can best be understood by once more discussing the sequence of operation of the apparatus. The ensuing description pertains principally to FIG. 32, although parenthetical reference will be made from time to time to other figures which show pictorially certain components which appear schematically in FIG. 32.

Operation can begin when power is turned on and the presence of power is indicated by the illumination of the pilot lamp 38 (FIG. 1) which is connected through a resistor 321 to the 115 volt D.C. bus 322. The toggle 42 (FIG. 1) may now be operated in the "F" direction to move the carriage forward. The toggle 42 is spring biased to its center or neutral position and is mechanically connected to operate four single pole double throw switches 323, 324, 325 and 326. The switches 323 and 324 are arranged to make contact in either direction after only a small amount of movement of the toggle 42 and to maintain contact throughout the remainder of the toggle movement. The switches 325 and 326 make contact only after a substantially greater movement of the toggle 42. In other words, the toggle 42 has two positions on each side of neutral, only the switches 323 and 324 making contact in each position nearest neutral while all four switches make contact in the extreme positions.

Assume that the toggle 42 is moved to the first forward position. Current then flows from the 80 volt D.C. source, through the right hand stationary contact and pole of switch 324, through a resistor 327, upward through the armature of motor 54, through the pole and right hand stationary contact of switch 323, and through the conductor 328 to ground. Since the field winding 329 is permanently connected to its 110 volt supply, the motor rotates in the forward direction. If the toggle 42 be moved to the first reverse position, a similar current path can be traced including the left hand contacts of switches 323 and 324, with the current flowing downward through the armature of motor 54 so that it rotates in the reverse direction. If the toggle 42 be moved to either extreme position the circuits are the same as in the first positions except that the switches 325 and 326 make contact, shorting out the resistor 327 and causing the motor 54 to rotate faster. Thus it can be seen that the toggle 42 allows the motor 54 to be rotated in either direction at either of two preselected speeds.

Figure 10:
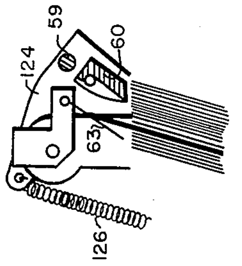

Returning to the sequence of operations, the operator moves the toggle 42 to either of the two forward positions causing the carriage and the drawer to move forward. After the cross bar 104 (FIGS. 2 and 8) has descended below the front wall of the drawer 48 (to the position shown in FIG. 2), the operator releases the toggle 42 and presses the switch 41 (FIG. 1) momentarily thereby energizing the solenoid 96 (FIGS. 2 and 7) which closes the pack of cards (if it were not already closed), pushing all the cards to the backward sloping position. The toggle 42 is again operated, bringing the drawer 48 and the carriage forward. When the desired tab is reached, (as indicated by the flags 63–67, FIG. 2) the toggle 42 is released, stopping the motor 54. Next the "open" switch 39 (FIG. 1) is pressed momentarily, allowing current to flow from the bus 322, through the normally closed switch 147 (FIGS. 7 and 17) the winding of a relay K1 and the switch 39 to ground. Energization of the relay K1 has a number of effects. First the normally open contact K1A closes thereby maintaining the relay K1 energized even though the push button switch 39 be released. Second, the closure of the normally open contact K1B energizes the solenoid 127 (FIG. 7) which in turn rotates the flat pack opening bar 60 (FIGS. 2 and 9–12) into place behind the selected tab (as shown in FIG. 10). Third, the closure of the normally open contacts K1C and K1D allows current to flow from the 80 volt supply through the contact K1C, downward through the armature of motor 54, and through the contact K1D to ground, thereby rotating the motor 54 in the reverse direction and moving the carriage and the drawer toward the rear. Next, the sequence of events previously described in connection with FIGS. 9–16 occurs and when the switch 134 (FIGS. 13–16) is closed, current flows from the bus 322, through the switches 147 and 134, and the winding of a relay K2 to ground. The normally open contact K2A now closes, energizing the solenoid 151 (FIG. 17) which clamps the rod 143 (shown in FIGS. 7 and 17) to the carriage. The carriage continues its backward motion until the normally closed switch 147 (FIGS. 7 and 17) is opened, which operation deenergizes the relays K1 and K2. Contacts K1C and K1D are thereby opened, stopping the motor 54; contact K1B is opened, deenergizing the solenoid 127 (thereby allowing the spring 126, FIG. 7, to return the pack opening bar 60 to its inactive position); and contact K2A is opened, deenergizing the solenoid 151 (thereby allowing the spring 145, FIGS. 7 and 17, to return the rod 143 to its normal position). The pack has now been opened behind the desired tab and the drawer is in the proper position as shown in FIG. 1 to enable individual cards to be abstracted and viewed.

As previously explained, the manipulation of individual cards is controlled simply by operation of the toggle 43 (FIG. 1). The toggle 43 has three positions, the neutral position shown, to which it is urged by springs, a forward position, and a backward position. Three switches are operated by the toggle 43, a single pole single throw switch 331, and two single pole double throw switches 332 and 333. The switch 331 is closed in the neutral position as shown but is opened when the toggle 43 is in either the forward or the backward position. The switches 332 and 333 are ordinary double throw switches, each having three positions, neutral as shown, forward and back.

To abstract the face card of the backward sloping portion and place it on the platen for viewing, the toggle 43 is moved to its forward position, thereby actuating the switches 331, 332 and 333. A relay winding K3 has one terminal connected to the control power bus 322 and its other terminal connected through the switch 331 to ground so that as soon as the toggle is moved away from its neutral position, the opening of the switch 331 deenergizes the relay K3 causing all of its contacts to revert to the normal position shown in the drawing. At the same time current flows from the 60 volt D.C. source through the right hand contact and pole of the switch 333, from right to left through the armature of the motor 235 (FIGS. 24 and 28), through the pole and right hand contact of the switch 332, through the conductor 334, and the normally closed contact K3C to ground. Since the field winding 335 of the motor 235 is permanently energized by its 125 volt D.C. supply, the motor rotates in the forward direction.

As previously explained, rotation of the motor 235 in the forward direction causes the wheels 241 and 243 (FIGS. 24 and 27) to rotate and when they rotate sufficiently to force the switch actuating rollers out of the detents, the switches 251 and 252 are closed and the switches 264 and 265 are thrown to the position opposite to that shown in the drawing. At this time the toggle 43 may be released and the motor 235 will continue to rotate. Current flows from the 60 volt D.C. source through the switch 251, from right to left through the armature of the motor 235, and through the switch 252 to the conductor 334. Since the release of the toggle 43 closed the switch 331, the relay K3 is again energized and current cannot flow through the contact K3C but can and does flow through the now closed contact K3A, the switch 265, and the contact K3B to ground. The motor 235 therefore continues to rotate as long as the switches 251, 252, 264 and 265 remain actuated.

As previously mentioned, the detent in the wheel 243 is broader than the detent in either of the wheels 241 and 242 so that as the wheels near the completion of one revolution, the switches 264 and 265 revert to the position shown in the drawing before the switches 251 and 252 are opened. The reversion of switches 264 and 265 to the position shown breaks the energization circuit to the motor 235 and completes a dynamic braking circuit by short circuiting the armature. The short circuit may be traced from the left side of the armature, through the switch 252, the conductor 334, the contact K3A, the switch 265, the switch 264, contact K3D, and the switch 251 to the right side of the armature. The motor therefore decelerates rapidly and is rotating very slowly when the roller drops into the detent in wheel 241 thereby opening switches 251 and 252. The opening of these switches breaks the dynamic braking circuit, reestablishing the initial conditions, whereupon the motor stops.

It is noted that if the toggle 43 be held in its forward position, the switches 264 and 265 have no effect since the relay K3 is deenergized and the contacts K3A, K3B and K3D remain open. The motor 235 will therefore continue to rotate as long as the toggle is held in the forward position and no dynamic braking will be applied. When the toggle 43 is released, the motor will complete its current cycle and stop the next time the wheels 243 and 241 reach their neutral positions.

Operation of the toggle 43 to the backward position completes circuits analogous to those above described, with the motor running backward. Current flows from the 60 volt D.C. supply through the left hand contact and pole of switch 332, from left to right through the armature of the motor 235, through the pole and left hand contact of the switch 333, the conductor 334, and the contact K3C to ground. The motor will continue to run as long as the toggle is held in the backward position. In the backward direction the wheel 243 rotates as before but the wheel 241 remains stationary while the wheel 242 rotates. When the toggle 43 is released, the motor energization circuit is completed through the switches 261 and 262, and when the neutral position is approached, dynamic braking is applied as in the case of forward operation.

Also shown in FIG. 32 is a winding 336 which, when energized, engages the clutch 269 (FIGS. 17 and 28). This winding is connected directly across the terminals of the armature of the motor 235 so that whenever the motor 235 is energized, the clutch 269 is engaged and the carriage is "inched" as previously explained. Of course, when the clutch 269 is disengaged, which is the normal condition, the motor 54 and the lead screw 55 (FIG. 28) cannot drive the motor 235.

*Summary*

From the foregoing description it can be seen that the present invention enables an operator at a remote point to view any or all file cards in a preselected drawer. The label on the front of the drawer is visible so that he may see that the proper drawer has been inserted into the machine. He may observe the titles on the tabs of the separator cards and open the pack behind any tab which he selects. He may view each card behind the selected tab and may go back and review cards previously viewed.

Many features contribute to the reliable operation of the apparatus of the present invention. A number of these, although previously mentioned, are worthy of further note. The use of the mohair strips solves the problem of the cards tending to revert to their former positions after the pack is opened. The streams of air directed to the sides of the cards adjacent to the opening in the pack facilitates the removal of but a single card at a time. The operation of the micrometer switch by the pressure of the tab against the pivoted pack opening bar provides a definite starting point from which to measure the distance the carriage must travel to place the opening in the pack directly beneath the card abstracting plates. The arrangement of grooves and orifices in the platen and plates contributes greatly to the reliability with which the cards are transferred from pack to plates to platen and back again. Either of the two modes of operation, forward or backward, may be selected simply by selecting the direction of rotation of the card motor. A single unitary member, the disc 71 with its cams on one side and its roller (for the scotch yoke) on the other, coordinates the movement of the plates, platen and carriage and the flow of air through plates and platen, thus greatly simplifying the synchronization problem.

Two additional features are incorporated in the apparatus of the present invention and each contributes to the satisfactory results which have been achieved. They have not been discussed previously since an appreciation of these features has not been necessary for an understanding of the remainder of the apparatus. Both features pertain to optics.

The television camera 32, FIG. 1, must include within its field of view not only the card on the platen 77 but also a field below the platen so that the operator can see the label on the drawer when the drawer is at the rear position and so that he can see the upstanding tabs and the legends on them as the drawer moves forward. This means that the card must be at the top of the field of view and the tabs at the bottom. In order to obtain a distortion free image of the card, without "keystoning", it is necessary that the optical axis of the camera be perpendicular to the plane of the card. If the camera simply be adjusted vertically until the proper field of view is obtained, it is found that the tabs cannot be seen clearly because the camera is so far down that tabs in adjacent columns appear to have no horizontal separation and that successive tabs in the same column lie directly behind each other. The view of the tabs can be improved by raising the camera and tilting it downward, but then the view of the card on the platen is distorted by the "keystone" effect. In the present apparatus the camera is moved up, as shown, the optical axis is maintained perpendicular to the card, but the lens axis shifted downward, off the optical center of the camera. By this expedient, the field of view is shifted downward so that the tabs are included yet the point of view of the tabs is above their level so that their images appear clearly and at the same time the optical axis is maintained perpendicular to the card so that distortion is avoided.

The other feature is the rest, or inactive, position of the pack opening bar 60. As the drawer comes forward, the operator should be able to see an image of not only that tab which is being engaged by a flag (see FIG. 2), but of succeeding tabs so that he may properly select the desired tab. The inactive position of the bar 60 is determined by the angular position to which the spring 126 (see FIG. 7) rotates the bracket 124. This position can be seen in FIGS. 8 and 9 and is selected so that the line of sight to the television camera is approximately parallel to the width of the bar 60 so that the camera "sees" only the edge of the bar, therefore causing a minimum of interference with the view of the tabs. Additionally, the bar 60 and the rod 59 are so positioned on the bracket 123 and 124 that the bar 60 is approximately behind the rod 59, as viewed by the camera 32.

*Modifications*

It will be understood that the specific embodiment of the invention shown and described herein is merely illustrative and that many refinements, additions, and modifications can be made to meet the requirements of various installations. One addition worthy of special note is apparatus for replacing the last card in the file drawer after viewing is completed.

It will be recalled that the apparatus as so far described provides for either "forward" operation, in which cards are taken from the backward sloping position, placed on the platen, and then placed on the forward sloping portion, or for "backward" operation, which is just the opposite. In either case, as one card is removed from the platen another is placed thereon and no provision has been made for removing a card from the platen without replacing it with another card. An actual installation must, of course, provide some means for replacing the last card, but various circumstances may require various modes of operation. For example, it might be desirable in some situations to coordinate the replacement of the last card which the pack closing operation. In another case it might be desirable to return the carriage to the rear position automatically after the last card has been replaced. In any case the basic operation may be the same and a simple manually controlled system will be described.

Turning now to FIG. 33, there is shown a micrometer switch 341 mounted on the upstanding post 169 with its actuator in the path of downward movement of the yoke 72. The switch 341 is positioned to be actuated by the yoke a short distance before it reaches its lower limit.

A flat bar 342 is supported by the upstanding post 169 and a similar upstanding post 343 and on this bar is mounted a solenoid 344 which is mechanically connected to and operates a valve 345. This valve is inserted in the pipe line 274 (the upper end of which leads to the distribution chamber 275, FIGS. 24 and 30) and the lower end of which, denoted 274' in FIG. 33, leads to the intake side of the fan 307 (FIG. 30).

Turning now to FIG. 34, which shows the electric connections, there is shown a source of control power connected through a push button switch 347 and the micrometer switch 341 to one terminal of the solenoid 344, the other terminal of which is grounded. There is also shown the valve 345 operated by the solenoid 344.

When the operator is finished viewing the cards behind a particular tab and wishes to replace the last card in the file without putting another on the platen, he depresses the push button switch 347 and holds it down. He then actuates the "card" toggle 43 (FIGS. 1 and 32) in either direction momentarily. The switch 347 has no immediate effect, since the switch 341 is open, and the plates pick the card off the platen and carry it into the V-shaped opening in the pack of cards. When the yoke 72 approaches its bottom position, the switch 341 is closed, energizing the solenoid 344 which in turn closes the valve 345. The main supply of air flow is thereby cut off with the result that the card is deposited in the pack but no new card is abstracted. The plates 73–76 and the yoke 72 return to their upper, neutral position in the manner previously described. The operator may now select a new tab, or have the drawer removed.

Another modification might be made in the mohair strips, which could be mounted directly on the frame, rather than on the carriage. Each strip could then be made considerably shorter than the length of the drawer since the mohair is required only in the vicinity of the opening in the pack.

In some cases it is desirable to add information to the cards as they are being viewed. This may be accomplished by adding a print head to the platen and providing for its control by the viewer.

The invention is not limited to use with the usual opaque file cards but may also be used to view transparencies. For such use, the platen can be made transparent or translucent in whole or in part and may have a source of illumination on the side away from the viewer.

A few modifications of the basic apparatus have been suggested and many other modifications will occur to those skilled in the art. It is therefore desired that the invention be limited only by the true scope of the appended claims.

What is claimed is:

1. For use with a plurality of records stored on edge with a plurality of separator cards, each separator card having a tab protruding above the level of said records, apparatus for facilitating the viewing of individual records, comprising, an open-topped container for supporting said records, first switch means, means responsive to actuation of said first switch means for dividing the records into two groups behind any selected separator card so that one group slopes forward and the other group slopes backward thereby forming a V shaped opening between groups, holding means outside of said container for supporting one of said records, second switch means, and means responsive to actuation of said second switch means for abstracting one of said records from said container and for transferring it to said holding means.

2. For use with a plurality of substantially planar records such as cards, photographs, films and the like, which records are stored on edge in an open topped container, said records being stored with a plurality of separator cards interspersed among the records, each separator card having an upstanding tab protruding above the top of the records, said records and separator cards being stored with such density that they can be divided into two groups, one sloping forward and the other sloping backward, apparatus for facilitating the viewing of individual records, comprising, a carriage for holding said container, motive means, means including said motive means for moving said carriage forward, means for preventing backward movement of selected tabs, means including said motive means for moving said carriage backward a predetermined distance whereby said pack is divided into two groups of records, one sloping forward and the other sloping backwards, support means outside of said container for holding a record in viewing position, and means for abstracting a record from one of said groups and for transferring said abstracted records to said support means.

3. Apparatus for opening a pack of records filed with a plurality of separator cards each having a tab extending above the records, comprising, a carriage for holding said records, motive means for moving said carriage, a member moveable to either an active or an inactive position, said member when in said active position lying transversely above the level of said records but below the level of said tabs whereby movement of said tabs is restricted, said member when in said inactive position being positioned so as to be incapable of engaging said tabs, manually operable switch means, and circuit means actuated by operation of said switch means for moving said member to said active position and for controlling said motive means to move said carriage a predetermined distance.

4. Apparatus for opening a pack of records filed with a plurality of separator cards each having a tab extending above the records, comprising, a carriage for holding said records, motive means for moving said carriage, manually operable means for selectively controlling said motive means to move said carriage forward or backward or to stop said carriage, means for indicating the approach of each of said tabs to a predetermined position on the path of forward movement of said carriage, a member moveable to either an active or an inactive position, said member when in said active position lying across said carriage above the level of said records but below the level of said tabs whereby movement of said tabs is restricted, said member when in said inactive position being positioned so as to be incapable of engaging said tabs, manually operable switch means, and circuit means actuated by operation of said switch means for moving said member to said active position and for controlling said motive means to move said carriage backward a predetermined distance.

5. Apparatus for opening a pack of file cards stored on edge in a standard open topped file drawer with separator cards interspersed, each separator card having a tab extending above the main body of cards, said apparatus comprising, a carriage for holding said drawer, motive means for moving said carriage and drawer forward and backward, manually operable means for selectively controlling said motive means to move said carriage forward or backward or to stop said carriage, means for indicating the approach of each of said tabs to a predetermined position on the path of forward movement of said carriage, tab holding means, means for biasing said tab holding means to an inactive position in which it is incapable of engaging said tabs, electromechanical means for overcoming said biasing means and for placing said tab holding means in an active position, said tab holding means when in said active position being positioned to prevent backward movement of those tabs which lie forward of said predetermined position, a circuit means interconnected with said motive means and said electromechanical means for automatically actuating said electromechanical means and controlling said motive means to move said carriage backward a predetermined distance, and manually operable switch means for initiating the automatic action of said circuit means, whereby an operator may move said carriage forward, stop said carriage when said indicating means shows the desired tab to be approaching said predetermined position, and operate said switch means to open said pack behind said desired tab.

6. Apparatus for opening a pack of records filed with a plurality of separator cards each having a tab extending above the records, comprising, a carriage for holding said records, motive means for moving said carriage, a tab movement limiting member, means for biasing said member to an inactive position in which it can not engage said tabs, electromechanical means for overcoming said biasing means and for placing said member in an active position lying across said carriage above the level of said records but below the level of said tabs, manually operable switch means, circuit means actuated by operation of said switch means for actuating said electromechanical means and for controlling said motive means to start said carriage moving backward, an auxiliary switch mounted on said member and actuated by the engagement of said member by a tab, and means operated by actuation of said auxiliary switch for controlling said motive means to stop said carriage after travelling a predetermined distance from the point at which said auxiliary switch was actuated.

7. Apparatus for opening a pack of substantially planar records such as cards, photographs, films, and the like, which records are stored on edge in an open topped container, said records being stored with a plurality of tab separator cards interspersed in the pack, each separator card having an upstanding tab protruding above the top of the records, said records and separator cards being stored with such density that they can be divided into two groups, one sloping forward and the other sloping backward, said apparatus comprising, a carriage for supporting said container, motive means for moving said carriage forward and backward, manually operable means for controlling said motive means for selectively moving said carriage forward or backward or stopping said carriage, means for indicating the approach of each of said tabs to a predetermined position on the path of forward movement of said carriage, a tab movement limiting member, spring means for urging said member to an inactive position in which it can not engage said tabs, electromechanical means for overcoming the urging of said spring and for placing said member in an active position lying transverse to said carriage above the level of said records but below the level of said tabs, manually operable switch means, circuit means actuated by operation of said switch means for actuating said electromechanical means and for controlling said motive means to start said carriage moving backward, an auxiliary switch mounted on said member and actuated by the engagement of said member by one of said tabs, and means operated by actuation of said auxiliary switch for controlling said motive means to stop said carriage after travelling a predetermined distance from the point at which said auxiliary switch is actuated.

8. Apparatus for opening a pack of records filed with plurality of separator cards each having a tab extending above the records, comprising, a carriage for holding said records, motive means for moving said carriage, selectively actuatable means for restricting movement of certain of said tabs yet permitting movement of said carriage, circuit means interconnected with said motive means and said selectively actuatable means for automatically actuating said selectively actuatable means and for moving said carriage a predetermined distance, and switch means for initiating operation of said circuit means.

9. In combination with apparatus for opening a pack of records by causing relative movement between a portion of said records and the main body of said records, means for minimizing the tendency of said records to revert to their former positions after the pack has been opened, comprising, an elongated strip of material having bristles protruding in a direction transverse to the length thereof, and means for mounting said strip of material with the ends of said bristles making contact with the edges of said records, whereby said bristles offer resistance to the movement of said records.

10. In combination with apparatus for opening a pack of records by causing relative movement between a portion of said records and the main body of said records, means for minimizing the tendency of said records to revert to their former positions after the pack has been opened, comprising, an elongated strip of material having bristles protruding in a direction transverse to the length thereof, means for positioning said strip of material adjacent to said pack of records with the ends of said bristles making contact with the edges of said records, whereby said material offers resistance to the movement of said records, and means for withdrawing said material from contact with said records, whereby said records may be removed readily from said apparatus.

11. Apparatus for handling records stored on edge in an open topped container, said records being stored loosely enough so that the records remain in two groups, one sloping forward and the other sloping backward with a V shaped opening between, comprising, a platen mounted above the V shaped opening between the groups of records, a generally flat plate, means for reducing the air pressure on one face of said platen and on one face of said plate, means for controlling the reduction of air pressure on said plate and said platen, means for moving said plate from a position above and to one side of said platen downward to a position level with said platen, further downward into said V shaped opening, upward to a position level with said platen, and finally upward to the original position above said platen, and means interconnected with said means for moving and with said pressure reducing means for starting the reduction of pressure on the face of said plate as it enters said V shaped opening, for restoring atmospheric pressure on said plate as it rises above a position abreast of said platen, and for starting the reduction of pressure on the face of said platen as said plate approaches said platen.

12. For use with a plurality of records stored on edge in an open topped container, said records being stored loosely enough so that they remain separated into two groups, the first group sloping forward and the second group sloping backward, apparatus for facilitating viewing of the records, comprising, supporting means outside of said container for holding a record, record handling means operative in either a first mode or a second mode, said handling means being operative in said first mode to remove said record from said supporting means, to place it with said first group of records, to withdraw a record from said second group of records and to place it on said supporting means, said handling means being operative in said second mode to remove said first mentioned record from said supporting means, to place it with said second group of records, to withdraw a record from said first group of records and to place it on said supporting means, and control means for selectively initiating operation of said record handling means in either said first mode or said second mode.

13. Apparatus for withdrawing a record from an opened pack of records and for placing the withdrawn record in viewing position, comprising, a platen for holding the withdrawn record in viewing position, a moveable plate for withdrawing a record from said pack and placing it on said platen, means for drawing air through said plate and said platen, a rotatable member, and means for controlling the position of said plate and the flow of air through said plate and said platen in accordance with the angular position of said rotatable member.

14. Apparatus for withdrawing a record from an opened pack of records and for placing the withdrawn record in viewing position, comprising, a platen for holding the withdrawn record in viewing position, a pair of moveable plates for withdrawing a record from said pack and placing it on said platen, means defining a path of movement of said plates, said path including positions adjacent to said platen and positions within the opening in said pack, means for drawing air through said plates and said platen, valve means for controlling the flow of air through said plates and said platen, a moveable member, and means for controlling said valve means and the positions of said plates on said path in accordance with the position of said member.

15. Apparatus for withdrawing a record from an opened pack of records and placing it in viewing position, comprising, a platen for holding the withdrawn record in viewing position, a pair of moveable plates for withdrawing a record from said pack and placing it on said platen, means defining a substantially vertical path of movement of said plates, said path including positions adjacent to said platen and positions within the opening in said pack, means defining a substantially horizontal path of movement of said platen, said last named path including a viewing position and a position adjacent to said plates, means for drawing air through said plates and said platen, valve means for controlling the flow of air through said plates and said platen, a rotatable member, and means for controlling said valve means, the position of said plates, and the position of said platen in accordance with the angular position of said member.

16. Apparatus for handling records stored on edge in an open topped container, said records being stored loosely enough so that the records remain in two groups, the first group sloping forward and the second group sloping backward forming a V shaped opening between, comprising, a generally flat plate, a platen, said plate and said platen each being formed with a depressed area on one surface and each formed with a passageway therethrough communicating with said respective depressed areas, means for mounting said platen above said V shaped opening, a fan, valve means, tubular means connecting each of said passageways to said valve means and connecting said valve means to the intake side of said fan, means for mounting said plate for substantially vertical motion in a path extending above said V shaped opening, means for moving said plate along said path through one cycle of movement from a position above said platen downward to a position level with said platen, downward into said V shaped opening, upward to a position level with said platen and further upward to the original position, and means including said valve means interconnected with said means for moving, for pneumatically connecting the intake of said fan to said passageway in said plate as said plate enters said V shaped opening, for pneumatically connecting said intake of said fan to said passageway in said platen as said plate approaches said platen in its upward movement and for pneumatically disconnecting the intake of said fan from said passageway in said plate as said plate rises above said platen.

17. Apparatus for facilitating the viewing of individual records of a pack of records stored on edge loosely enough so that they remain separated into two groups, the records of the first group sloping forward and the records of the second group sloping backward, comprising, a support for holding a single record, a rotatable member, record handling means operable in either a first or a second mode depending upon the direction of rotation of said member, said handling means being operative in said first mode to remove a record from said support, to place it with said second group, to withdraw a record from said first group and to place it on said support, said handling means being operative in said second mode to remove a record from said support, to place it with said first group, to withdraw a record from said second group and to place it on said support, and means for selectively rotating said member in either a first or a second direction, whereby said handling means operates in either said first or said second mode.

References Cited in the file of this patent

UNITED STATES PATENTS

| | | |
|---|---|---|
| 1,969,946 | Root | Aug. 14, 1934 |
| 2,371,491 | Wright | Mar. 13, 1945 |
| 2,398,067 | Winkler | Apr. 9, 1946 |
| 2,631,037 | Lake et al. | Mar. 10, 1953 |
| 2,918,656 | Nolde et al. | Dec. 22, 1959 |